(12) United States Patent
Cho

(10) Patent No.: US 12,321,544 B2
(45) Date of Patent: Jun. 3, 2025

(54) ELECTRONIC DEVICE INCLUDING A SENSOR LAYER HAVING A PEN-SENSING ELECTRODE

(71) Applicant: SAMSUNG DISPLAY CO., LTD., Yongin-si (KR)

(72) Inventor: Maeum Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/598,344

(22) Filed: Mar. 7, 2024

(65) Prior Publication Data

US 2024/0361855 A1 Oct. 31, 2024

(30) Foreign Application Priority Data

Apr. 26, 2023 (KR) .......... 10-2023-0054568

(51) Int. Cl.
  *G06F 3/00* (2006.01)
  *G06F 3/041* (2006.01)
  *G06F 3/044* (2006.01)

(52) U.S. Cl.
  CPC .......... *G06F 3/0412* (2013.01); *G06F 3/0442* (2019.05); *G06F 3/0445* (2019.05); *G06F 3/0446* (2019.05)

(58) Field of Classification Search
  CPC ............................................. G06F 3/041–048
  See application file for complete search history.

(56) References Cited

U.S. PATENT DOCUMENTS

| 9,105,255 | B2 | 8/2015 | Brown et al. |
| 9,639,220 | B2 | 5/2017 | Wang |
| 10,146,336 | B2 | 12/2018 | Lee et al. |
| 11,182,581 | B2 | 11/2021 | Li et al. |
| 2019/0212939 | A1* | 7/2019 | Huang ................. G06F 3/0604 |
| 2021/0072864 | A1* | 3/2021 | Park ..................... G06F 3/0446 |
| 2022/0334700 | A1 | 10/2022 | Lim et al. |

FOREIGN PATENT DOCUMENTS

| CN | 111679760 A | 9/2020 |
| KR | 10-2022-0143217 A | 10/2022 |

\* cited by examiner

*Primary Examiner* — Roy P Rabindranath
(74) *Attorney, Agent, or Firm* — CHAU & ASSOCIATES, LLC

(57) ABSTRACT

An electronic device includes a display layer displaying an image. A sensor layer is disposed on the display layer. The sensor layer includes a plurality of first sensing electrodes including a plurality of sensing patterns arranged along a first direction, and a plurality of bridge patterns electrically connecting adjacent sensing patterns of the plurality of sensing patterns. A plurality of second sensing electrodes includes a plurality of sensing portions arranged along a second direction crossing the first direction, and first connection portions extending in the second direction from the plurality of sensing portions. A pen-sensing electrode is disposed on a same layer as the plurality of bridge patterns. The pen-sensing electrode is disposed on a different layer than the plurality of sensing patterns and the plurality of second sensing electrodes.

20 Claims, 12 Drawing Sheets

ELECTRONIC DEVICE INCLUDING A SENSOR LAYER HAVING A PEN-SENSING ELECTRODE

CROSS-REFERENCE TO RELATED APPLICATIONS

This application claims priority under 35 U.S.C. § 119 to Korean Patent Application No. 10-2023-0054568, filed on Apr. 26, 2023 in the Korean Intellectual Property Office, the disclosure of which is incorporated by reference in its entirety herein.

1. TECHNICAL FIELD

The present disclosure herein relates to an electronic device which detects an input by a pen.

2. DISCUSSION OF RELATED ART

Multimedia electronic devices such as a television, a mobile phone, a tablet computer, a navigation system, and a game console include a display device for displaying images. Electronic devices may include a sensor layer (or input sensor) that provides a touch-based input method through which a user may intuitively and conveniently input information or a command with ease. The touch-based input method may serve as an input in addition to a typical input method using a button, a keyboard, a mouse, and the like. The sensor layer may detect a touch or pressure by a user's body or a proximity of the user. However, there is an increasing demand for using a pen by which a detailed touch input is possible for users who are accustomed to inputting information by using a writing instrument or for specific application programs, such as application programs for sketching, drawing, etc.

SUMMARY

Embodiments of the present disclosure provide an electronic device which detects an input applied by a pen.

According to an embodiment of the present inventive concept, an electronic device includes a display layer displaying an image. A sensor layer is disposed on the display layer. The sensor layer includes a plurality of first sensing electrodes including a plurality of sensing patterns arranged along a first direction, and a plurality of bridge patterns electrically connecting adjacent sensing patterns of the plurality of sensing patterns. A plurality of second sensing electrodes includes a plurality of sensing portions arranged along a second direction crossing the first direction, and first connection portions extending in the second direction from the plurality of sensing portions. A pen-sensing electrode is disposed on a same layer as the plurality of bridge patterns. The pen-sensing electrode is disposed on a different layer than the plurality of sensing patterns and the plurality of second sensing electrodes.

In an embodiment, the pen-sensing electrode may include first pen-sensing patterns, and second pen-sensing patterns. The first pen-sensing patterns may overlap boundaries of the plurality of sensing patterns and the plurality of sensing portions in a plan view, and the second pen-sensing patterns may be adjacent to boundaries of the plurality of bridge patterns.

In an embodiment, the plurality of second sensing electrodes further may include second connection portions extending from the plurality of sensing portions in the first direction.

In an embodiment, the pen-sensing electrode may further include third pen-sensing patterns, and the third pen-sensing patterns may overlap boundaries of the second connection portions in the plan view.

In an embodiment, the pen-sensing electrode may further include fourth pen-sensing patterns overlapping the plurality of sensing patterns in the plan view.

In an embodiment, the sensor layer may further include pen bridge patterns electrically connecting the fourth pen-sensing patterns. The pen bridge patterns may be disposed on a same layer as the plurality of sensing patterns and the plurality of second sensing electrodes.

In an embodiment, the pen bridge patterns may extend in the second direction and may be arranged to be spaced apart from each other in the first direction.

In an embodiment, in the plan view each of the fourth pen-sensing patterns may have a smaller size than each of the plurality of sensing patterns.

In an embodiment, the fourth pen-sensing patterns may be arranged to be spaced apart from the first to third pen-sensing patterns in the plan view.

In an embodiment, the plurality of bridge patterns and the pen-sensing electrode may be disposed directly on a first layer. The plurality of sensing patterns and the plurality of second sensing electrodes may be disposed directly on a second layer. A distance from the display layer to the second layer may be greater than a distance from the display layer to the first layer.

In an embodiment, the plurality of sensing patterns and the plurality of second sensing electrodes may be disposed directly on a first layer, and the plurality of bridge patterns and the pen-sensing electrode may be disposed directly on a second layer. A distance from the display layer to the second layer may be greater than a distance from the display layer to the first layer.

According to an embodiment of the present inventive concept, an input-sensing unit includes a plurality of first sensing electrodes including a plurality of sensing patterns arranged along a first direction, and a plurality of bridge patterns disposed on a different layer than the plurality of sensing patterns. A plurality of second sensing electrodes includes a plurality of sensing portions arranged along a second direction crossing the first direction, and first connection portions extending from the plurality of sensing portions in the second direction. First pen-sensing patterns are disposed on a same layer as the plurality of bridge patterns and overlap boundaries of the plurality of sensing patterns and the plurality of sensing portions in a plan view. Second pen-sensing patterns are disposed on the same layer as the plurality of bridge patterns. The second pen-sensing patterns are adjacent to boundaries of the plurality of bridge patterns.

In an embodiment, the plurality of second sensing electrodes may further include second connection portions extending from the plurality of sensing portions in the first direction.

In an embodiment, the input-sensing unit may further include third pen-sensing patterns disposed on the same layer as the plurality of bridge patterns and overlapping boundaries of the second connection portions in the plan view.

In an embodiment, the input-sensing unit may further include fourth pen-sensing patterns disposed on the same layer as the plurality of bridge patterns and overlapping the plurality of sensing patterns in the plan view. Pen bridge patterns are disposed on a same layer as the plurality of sensing patterns and the plurality of second sensing electrodes. The pen bridge patterns electrically connect the fourth pen-sensing patterns.

In an embodiment, the pen bridge patterns may extend in the second direction and are arranged to be spaced apart from each other in the first direction.

In an embodiment, in the plan view each of the fourth pen-sensing patterns may have a smaller size than each of the plurality of sensing patterns.

In an embodiment, the fourth pen-sensing patterns may be arranged to be spaced apart from the first to third pen-sensing patterns in the plan view.

In an embodiment, the plurality of sensing patterns and the plurality of second sensing electrodes may be disposed directly on a first layer, and the plurality of bridge patterns, the first pen-sensing patterns, and the second pen-sensing patterns may be disposed directly on a second layer. The second layer may be disposed above the first layer.

In an embodiment, the plurality of bridge patterns, the first pen-sensing patterns, and the second pen-sensing patterns may be disposed directly on a first layer, and the plurality of sensing patterns and the plurality of second sensing electrodes may be disposed directly on a second layer. The second layer may be disposed above the first layer.

BRIEF DESCRIPTION OF THE DRAWINGS

The accompanying drawings are included to provide a further understanding of embodiments of the present inventive concept, and are incorporated in and constitute a part of this specification. The drawings illustrate embodiments of the present inventive concept and, together with the description, serve to explain principles of the present inventive concept. In the drawings.

DETAILED DESCRIPTION OF EMBODIMENTS

Figure 1:
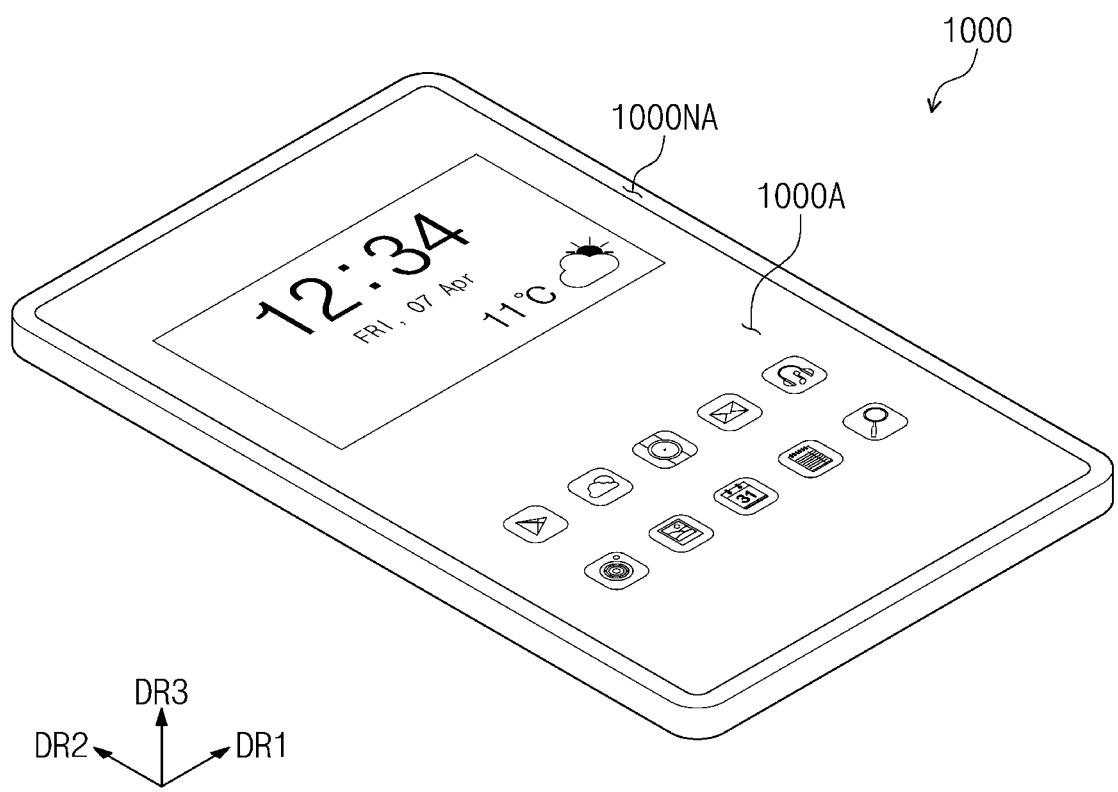
FIG. 1 is a perspective view of an electronic device according to an embodiment of the present inventive concept.

In this specification, it will be understood that when an element (e.g., a region, a layer, a portion, or the like) is referred to as "being on", "connected to" or "coupled to" another element, it may be directly disposed on/connected/coupled to the other element, or intervening elements may be disposed therebetween. When an element (e.g., a region, a layer, a portion, or the like) is referred to as "being directly on", "directly connected to" or "directly coupled to" another element, no intervening elements may be disposed therebetween.

Like reference numerals or symbols refer to like elements throughout. In the drawings, the thickness, the ratio, and the dimension of the elements may be exaggerated for effective description of the technical contents. The term "and/or" includes all combinations of one or more of the associated listed elements.

Although the terms first, second, etc. may be used to describe various elements, these elements should not necessarily be limited by these terms. These terms may only be used to distinguish one element from another element. For example, a first element may be referred to as a second element, and similarly, a second element may also be referred to as a first element without departing from the scope of embodiments of the present inventive concept. The singular forms include the plural forms as well, unless the context clearly indicates otherwise.

The terms such as "below", "lower", "above", "upper" and the like, may be used herein for the description to describe a relationship of one element to another element illustrated in the figures. It will be understood that the terms have a relative concept and are described on the basis of the orientation depicted in the figures.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

The terms "part" and "unit" mean a software component or a hardware component that performs a specific function. For example, the hardware component may include a field-programmable gate array (FPGA) or an application-specific integrated circuit (ASIC). A software component may be referred to as data used by an executable code and/or an executable code in an addressable storage medium. Accordingly, software components may be, for example, object-oriented software components, class components, and task components, and may include processes, functions, properties, procedures, subroutines, program code segments, drivers, firmwares, microcodes, circuits, data, databases, data structures, tables, arrays or variables.

Unless otherwise defined, all terms (including technical and scientific terms) used in this specification have the same meaning as commonly understood by one of ordinary skill in the art to which an embodiment of the present inventive concept belongs. In addition, terms such as terms defined in commonly used dictionaries should be interpreted as having a meaning consistent with the meaning having in the context of the related technology, and should not be interpreted as too ideal or too formal unless explicitly defined here.

Hereinafter, embodiments of the present inventive concept will be described with reference to the drawings.

FIG. 1 is a perspective view of an electronic device 1000 according to an embodiment of the present inventive concept.

Referring to FIG. 1, the electronic device 1000 may be a device activated in response to an electrical signal. For example, in an embodiment the electronic device 1000 may be a mobile phone, a foldable mobile phone, a laptop computer, a television, a tablet computer, a car navigation system, a game console, or a wearable device. However, embodiments of the present inventive concept are not necessarily limited thereto and the electronic device 1000 may be various other small, medium or large sized devices. In FIG. 1, the electronic device 1000 is illustrated as a mobile phone.

The electronic device 1000 may have an active region 1000A and a peripheral region 1000NA which are defined therein. The electronic device 1000 may display images through the active region 1000A. In an embodiment, the active region 1000A may include a surface extending in a plane defined by a first direction DR1 and a second direction DR2 that crosses the first direction DR1. For example, in an embodiment, the second direction DR2 may be perpendicular to the first direction DR1. However, embodiments of the present inventive concept are not necessarily limited thereto. The peripheral region 1000NA may at least partially surround the active region 1000A. However, embodiments of the present inventive concept are not necessarily limited thereto. For example, in an embodiment of the present inventive concept, the peripheral region 1000NA may be omitted.

A thickness direction of the electronic device 1000 may be parallel to a third direction DR3 crossing the first direction DR1 and the second direction DR2. For example, in an embodiment the third direction DR3 may be perpendicular to the first and second directions DR1, DR2. However, embodiments of the present inventive concept are not necessarily limited thereto. Accordingly, a front surface (e.g., an upper surface) and a rear surface (e.g., a lower surface) of each member constituting the electronic device 1000 are defined on the basis of the third direction DR3.

Figure 2:
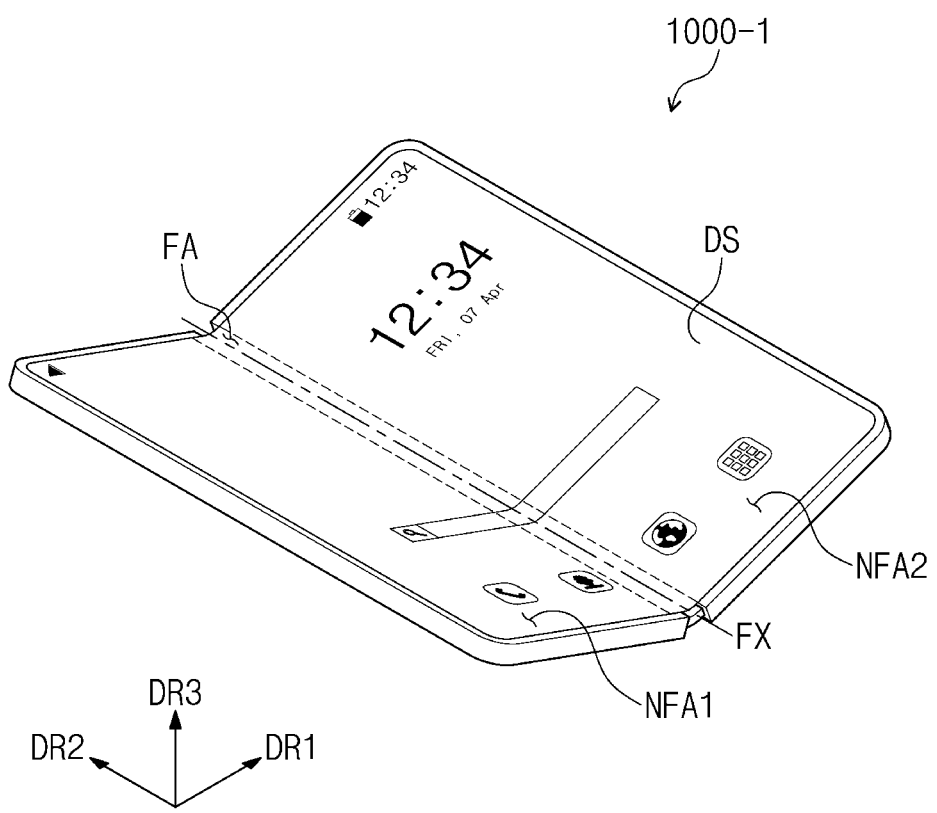
FIG. 2 is a perspective view of an electronic device according to an embodiment of the present inventive concept.

FIG. 2 is a perspective view of an electronic device 1000-1 according to an embodiment of the present inventive concept.

Referring to FIG. 2, the electronic device 1000-1 may include a folding region FA and a plurality of non-folding regions NFA1 and NFA2. The non-folding regions NFA1 and NFA2 may include a first non-folding region NFA1 and a second non-folding region NFA2. The folding region FA may be disposed between the first non-folding region NFA1 and the second non-folding region NFA2 (e.g., in the first direction DR1). The folding region FA may be referred to as a foldable region, and the first and second non-folding regions NFA1 and NFA2 may be referred to as first and second non-foldable regions.

As illustrated in FIG. 2, the folding region FA may be folded with respect to a folding axis FX that extends parallel to the second direction DR2. In a state in which the electronic device 1000-1 is folded, the folding region FA may have a predetermined curvature and radius of curvature.

The first non-folding region NFA1 and the second non-folding region NFA2 may face each other when the electronic device 1000-1 is folded. For example, in an embodiment the electronic device 1000-1 may be in-folded such that a display surface DS is not exposed to the outside.

In an embodiment of the present inventive concept, the electronic device 1000-1 may be out-folded such that the display surface DS is exposed to the outside. In an embodiment of the present inventive concept, the electronic device 1000-1 in an unfolded state may be in-folded or out-folded. However, embodiments of the present inventive concept are not necessarily limited thereto.

FIG. 2 illustrates that one folding axis FX is defined in the electronic device 1000-1. However, embodiments of the present inventive concept are not necessarily limited thereto. For example, in an embodiment a plurality of folding axes may be defined in the electronic device 1000-1, and the electronic device 1000-1 in an unfolded state may be in-folded or out-folded with respect to each of the plurality of folding axes.

FIGS. 1 and 2 respectively illustrate a bar-type electronic device 1000 and a foldable-type electronic device 1000-1 as an example. However, embodiments of the present inventive concept are not necessarily limited thereto. For example, the following description may be applied to various electronic devices such as a curved electronic device, a rollable electronic device, or a slidable electronic device.

Figure 3:
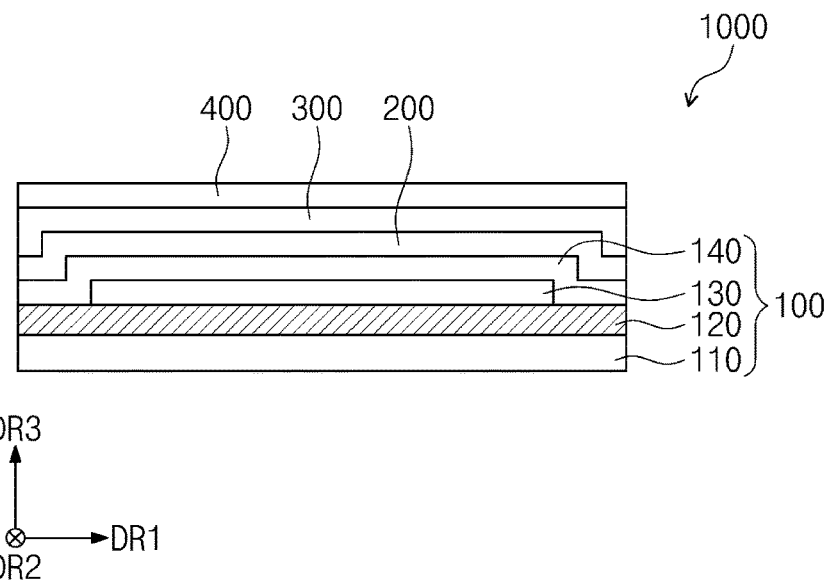
FIG. 3 is a cross-sectional view of an electronic device according to an embodiment of the present inventive concept.

FIG. 3 is a cross-sectional view of an electronic device 1000 according to an embodiment of the present inventive concept.

Referring to FIG. 3, in an embodiment the electronic device 1000 may include a display layer 100, a sensor layer 200 (e.g., an input-sensing unit), an anti-reflection layer 300, and a window 400.

The display layer 100 may include a base substrate 110, a circuit layer 120, a light-emitting element layer 130, and an encapsulation layer 140.

The base substrate 110 may be a member which provides a base surface on which the circuit layer 120 is disposed. In an embodiment, the base substrate 110 may be a glass substrate, a metal substrate, a polymer substrate, or the like. However, embodiments of the present inventive concept are not necessarily limited thereto, and the base substrate 110 may be an inorganic layer, an organic layer or a composite material layer.

The circuit layer 120 may be disposed on the base substrate 110 (e.g., disposed directly thereon in the third direction DR3). In an embodiment, the circuit layer 120 may include an insulating layer, a semiconductor pattern, a conductive pattern, a signal line, and the like. In an embodiment, an insulating layer, a semiconductor layer, and a conductive layer are formed on the base substrate 110 through coating, deposition, etc., and then the insulating layer, the semiconductor layer, and the conductive layer may be selectively patterned by performing a photolithography process multiple times. Thereafter, the semiconductor pattern, the conductive pattern, and the signal line included in the circuit layer 120 may be formed.

The light-emitting element layer 130 may be disposed on the circuit layer 120. The light-emitting element layer 130 may include a light-emitting element. For example, in an embodiment the light-emitting element layer 130 may include an organic light-emitting material, an inorganic light-emitting material, an organic-inorganic light-emitting material, quantum dots, quantum rods, a micro LED, or a nano LED.

The encapsulation layer 140 may be disposed on the light-emitting element layer 130 (e.g. disposed directly thereon). The encapsulation layer 140 may protect the light-emitting element layer 130 against moisture, oxygen, and impurities such as dust particles.

The sensor layer 200 may be disposed on the display layer 100. For example, in an embodiment the sensor layer 200 may be formed on the display layer 100 through a continuous process. In this embodiment, it may be expressed that the sensor layer 200 is directly disposed on the display layer 100. The wording "directly disposed" may mean that there are no intervening layers between the sensor layer 200 and the display layer 100. For example, an additional adhesive member may not be disposed between the sensor layer 200 and the display layer 100. Alternatively, in an embodiment the sensor layer 200 may be bonded to the display layer 100 via an adhesive member. The adhesive member may include a typical bonding agent or adhesive agent known in the art.

In an embodiment, the anti-reflection layer 300 may be disposed on the sensor layer 200. The anti-reflection layer 300 may reduce reflectance for external light incident from the outside of the electronic device 1000. In an embodiment, the anti-reflection layer 300 may be directly disposed on the sensor layer 200 (e.g., in the third direction DR3). However, embodiments of the present inventive concept are not necessarily limited thereto, and an adhesive member may be disposed between the anti-reflection layer 300 and the sensor layer 200 in some embodiments.

The window 400 may be disposed on the anti-reflection layer 300 (e.g., in the third direction DR3). In an embodiment, an adhesive member may be disposed between the anti-reflection layer 300 and the window 400. However, embodiments of the present inventive concept are not necessarily limited thereto. The window 400 may include an optically transparent insulating material. For example, in an embodiment the window 400 may include glass or plastic. The window 400 may have a multi-layered structure or a single-layered structure. For example, the window 400 may include a plurality of plastic films bonded via an adhesive agent, or a glass substrate and a plastic film which are bonded via an adhesive agent.

Figure 4:
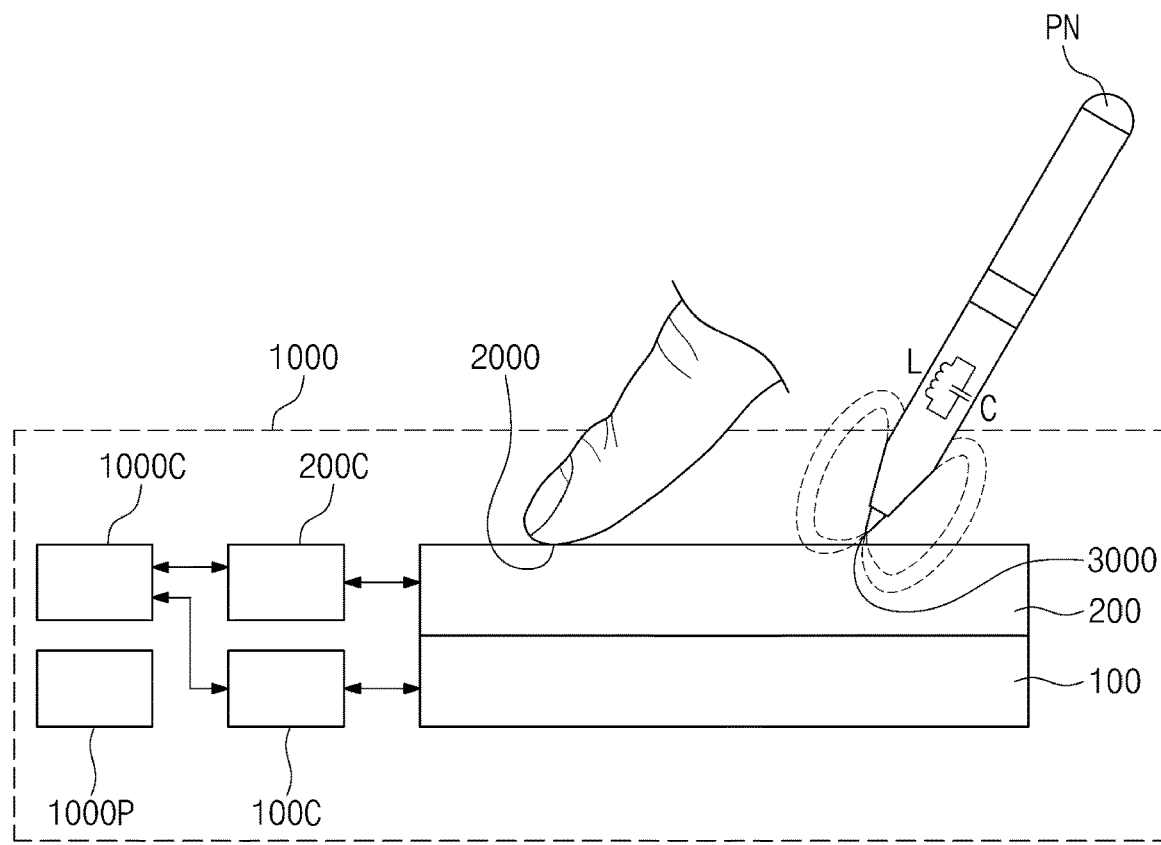
FIG. 4 is a view for illustrating an operation of an electronic device according to an embodiment of the present inventive concept.

FIG. 4 is a view illustrating an operation of an electronic device 1000 according to an embodiment of the present inventive concept.

Referring to FIG. 4, in an embodiment the electronic device 1000 may include a display layer 100, a sensor layer 200, a display driver 100C, a sensor driver 200C, a main driver 1000C, and a power circuit 1000P.

The display layer 100 may be a component which substantially forms an image. For example, in an embodiment the display layer 100 may be a light-emitting-type display layer, and for example, may be an organic light-emitting display layer, an inorganic light-emitting display layer, an organic-inorganic light-emitting display layer, a quantum dot display layer, a micro-LED display layer, or a nano LED display layer. However, embodiments of the present inventive concept are not necessarily limited thereto.

The sensor layer 200 may be disposed on the display layer 100 (e.g., disposed directly thereon). The sensor layer 200 may detect an external input applied from the outside. In an embodiment, the sensor layer 200 may be an integrated sensor which is continuously formed during a manufacturing process of the display layer 100, and may be an external sensor attached to the display layer 100. The sensor layer 200 may be referred to as a sensor, an input-sensing layer, an input-sensing panel, or an electronic device for sensing input coordinates.

The sensor layer 200 may detect a first input 2000 or a second input 3000 which is applied from the outside. The first input 2000 and the second input 3000 each may be an input means which may cause a change in capacitance of the sensor layer 200. For example, in an embodiment the first input 2000 may be a passive-type input means such as a user's body part (e.g., the user's finger). The second input 3000 may be an input by a pen PN. For example, the pen PN may be a passive-type pen or an active-type pen.

In an embodiment of the present inventive concept, the pen PN may be a device that generates a magnetic field having a predetermined resonant frequency. The pen PN may be configured to transmit an output signal based on an electromagnetic resonance. The pen PN may be referred to as an input device, an input pen, a magnetic pen, a stylus pen, or an electromagnetic resonance pen.

In an embodiment, the pen PN may include an LC resonant circuit. The LC resonant circuit may include an inductor (L) and a capacitor (C). In an embodiment of the present inventive concept, the LC resonant circuit may be a variable resonant circuit in which a resonant frequency varies. In this embodiment, the inductor (L) may be a variable inductor and/or the capacitor (C) may be a variable capacitor. However, embodiments of the present inventive concept are not necessarily limited thereto.

The inductor (L) generates an electric current caused by a magnetic field formed in the sensor layer 200. The generated electric current is transmitted to the capacitor (C). The capacitor (C) charges an electric current input from the inductor (L), and then discharges the charged electric current into the inductor (L). Thereafter, the inductor (L) may produce a magnetic field having a resonant frequency. An induced electric current may flow in the sensor layer 200 due to the magnetic field produced by the pen PN, and the induced electric current may be transmitted to the sensor driver 200C as a reception signal (or sensing signal).

The main driver 1000C may control an overall operation of the electronic device 1000. For example, the main driver 1000C may control operations of the display driver 100C and the sensor driver 200C. In an embodiment, the main driver 1000C may include at least one microprocessor, and further include a graphics controller. The main driver 1000C may be referred to as an application processor, a central processing unit, or a main processor.

The display driver 100C may drive the display layer 100. The display driver 100C may receive video data and a control signal from the main driver 1000C. The control signal may include various signals. For example, in an embodiment the control signal may include an input vertical synchronization signal, an input horizontal synchronization signal, a main clock, a data enable signal, and the like.

The sensor driver 200C may drive the sensor layer 200. The sensor driver 200C may receive a control signal from the main driver 1000C. The control signal may include a clock signal from the sensor driver 200C. Also, the control signal may further include a mode determination signal which determines a driving mode of each of the sensor driver 200C and the sensor layer 200.

In an embodiment, the sensor driver 200C and the sensor layer 200 may be driven in a first mode, a second mode or a third mode. For example, the first mode is a mode in which the first input 2000 is sensed, the second mode is a charging mode in which the second input 3000 is sensed, and the third mode is a mode in which the second input 3000 is sensed. The first mode may be referred to as a touch-sensing mode, and the second mode and the third mode may be referred to as a pen-sensing mode.

Switching between the touch-sensing mode and the pen-sensing mode may be modified variously. For example, in an embodiment the sensor driver 200C and the sensor layer 200 may detect the first input 2000 and the second input 3000 through time-division driving. Alternatively, switching between the touch-sensing mode and the pen-sensing mode may be performed by a user's selection, and/or either of the touch-sensing mode or the pen-sensing mode may be activated or switched by activation of a specific application program. Further, while the sensor driver 200C and the sensor layer 200 are alternately operated in a touch-sensing mode and a pen-sensing mode, the touch-sensing mode may be maintained when the first input 2000 is detected, or the pen-sensing mode may be maintained when the second input 3000 is detected.

In an embodiment, the sensor driver 200C may calculate coordinate information about an input on the basis of a signal received from the sensor layer 200, and provide a coordinate signal having the coordinate information to the main driver 1000C. The main driver 1000C executes an operation corresponding to a user input on the basis of the coordinate signal. For example, the main driver 1000C may operate the display driver 100C such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, in an embodiment the plurality of driving voltages may include a gate high voltage, a gate low voltage, an ELVSS voltage, an ELVDD voltage, an initialization voltage, and the like. However, embodiments of the present inventive concept are not necessarily limited thereto.

Figure 5:
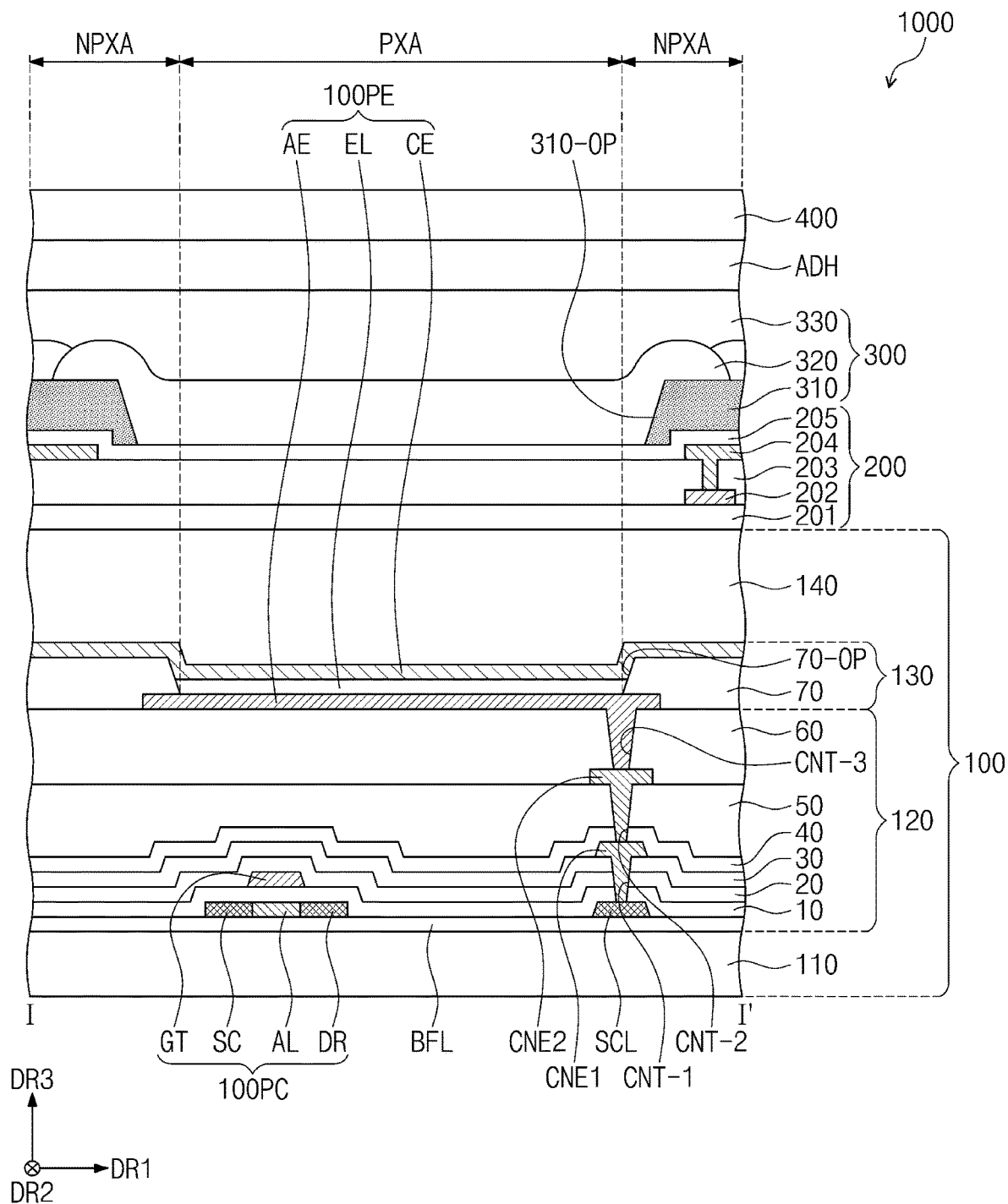
FIG. 5 is a cross-sectional view of an electronic device according to an embodiment of the present inventive concept.

FIG. 5 is a cross-sectional view of an electronic device 1000 according to an embodiment of the present inventive concept.

Referring to FIG. 5, in an embodiment the electronic device 1000 may include a display layer 100, a sensor layer 200, an anti-reflection layer 300, an adhesive layer ADH, and a window 400. The adhesive layer ADH may be disposed between the anti-reflection layer 300 and the window 400 (e.g., in the third direction DR3). In an embodiment, the adhesive layer ADH may include a typical bonding agent or an adhesive agent known in the art which provides light transmission.

At least one inorganic layer is formed on an upper surface of a base substrate 110. In an embodiment, the inorganic layer may include at least one of aluminum oxide, titanium oxide, silicon oxide, silicon nitride, silicon oxynitride, zirconium oxide, or hafnium oxide. The inorganic layer may be formed as a multi-layer. Multi-layered inorganic layers may be composed of a barrier layer and/or a buffer layer. In an embodiment shown in FIG. 5, the display layer 100 is illustrated to include a buffer layer BFL.

The buffer layer BFL may increase a bonding force between the base substrate 110 and the semiconductor pattern. In an embodiment, the buffer layer BFL may include at least one of silicon oxide, silicon nitride, or silicon oxynitride. For example, the buffer layer BFL may have a structure in which a silicon oxide layer and a silicon nitride layer are alternately stacked (e.g., in the third direction DR3).

A semiconductor pattern may be disposed on the buffer layer BFL (e.g., disposed directly thereon in the third direction DR3). In an embodiment, the semiconductor pattern may include polysilicon. However, embodiments of the present inventive concept are not necessarily limited thereto and the semiconductor pattern may include amorphous silicon, low-temperature polycrystalline silicon, or an oxide semiconductor in some embodiments.

FIG. 5 illustrates a portion of a semiconductor pattern but a semiconductor pattern may be further disposed in another region. The semiconductor pattern may be arranged across pixels in accordance with a specific design rule. The semiconductor pattern may have different electrical properties depending on whether doped or not. For example, in an embodiment the semiconductor pattern may include a first region having high conductivity and a second region having low conductivity. The first region may be doped with an N-type dopant or P-type dopant. A P-type transistor may include a doped region doped with a P-type dopant, and an N-type transistor may include a doped region doped with an N-type dopant. The second region may be an undoped region, or may be a doped region having a lower concentration than that of the first region.

The first region may have higher conductivity than the second region and substantially serve as an electrode or a signal line. The second region may substantially correspond to an active region (e.g., a channel) of a transistor. For example, a portion of the semiconductor pattern may be an active region of a transistor, another portion may be a source or drain of a transistor, and still another portion may be a connection electrode or connection signal line.

In an embodiment, pixels each may have an equivalent circuit including seven transistors, one capacitor, and a light-emitting element, and an equivalent circuit diagram of a pixel may be transformed into various forms. FIG. 5 illustrates one transistor 100PC and a light-emitting element 100PE included in a pixel as an example.

A source region SC, an active region AL, and a drain region DR of the transistor 100PC may be formed from a semiconductor pattern. The source region SC and the drain region DR may extend in opposite directions (e.g., the first direction DR1) from the active region AL on a cross section. FIG. 5 illustrates a portion of a connection signal line SCL formed from a semiconductor pattern. In an embodiment, the connection signal line SCL may be connected to the drain region DR of the transistor 100PC on a plane.

A first insulating layer 10 may be disposed on the buffer layer BFL (e.g., disposed directly thereon in the third direction DR3). The first insulating layer 10 may overlap a plurality of pixels in common and cover a semiconductor pattern. The first insulating layer 10 may be an inorganic layer and/or an organic layer, and have a single- or multi-layered structure. In an embodiment, the first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single-layered silicon oxide layer. Not only the first insulating layer 10 but also an insulating layer of the below-described circuit layer 120 may be an inorganic layer and/or an organic layer, and have a single- or multi-layered structure. The inorganic layer may include at least one of the above materials. However, embodiments of the present inventive concept are not necessarily limited thereto.

A gate GT of the transistor 100PC may be disposed on the first insulating layer 10 (e.g., disposed directly thereon in the third direction DR3). The gate GT may be a portion of a metal pattern. The gate GT may overlap the active region AL (e.g., in the third direction DR3). In an embodiment, during a process of doping a semiconductor pattern, the gate GT may function as a mask.

A second insulating layer 20 may be disposed on the first insulating layer 10 (e.g., directly thereon in the third direction DR3) and cover the gate GT. The second insulating layer 20 may overlap pixels in common (e.g., in the third direction DR3). The second insulating layer 20 may be an inorganic layer and/or an organic layer, and have a single- or multi-layered structure. In an embodiment, the second insulating layer 20 may include at least one of silicon oxide, silicon nitride, or silicon oxynitride. In this embodiment, the second insulating layer 20 may have a multi-layered structure in which a silicon oxide layer and a silicon nitride layer are included.

A third insulating layer 30 may be disposed on the second insulating layer 20 (e.g., disposed directly thereon in the third direction DR3). The third insulating layer 30 may have a single-layered or multi-layered structure. For example, in an embodiment in which the third insulating layer 30 may have a multi-layered structure, a silicon oxide layer and a silicon nitride layer may be included. However, embodiments of the present inventive concept are not necessarily limited thereto.

A first connection electrode CNE1 may be disposed on the third insulating layer 30 (e.g., disposed directly thereon). In an embodiment, the first connection electrode CNE1 may be connected to a connection signal line SCL via a contact hole CNT-1 passing through the first, second, and third insulating layers 10, 20, and 30.

A fourth insulating layer 40 may be disposed on the third insulating layer 30 (e.g., disposed directly thereon in the third direction DR3). The fourth insulating layer 40 may be a single-layered silicon oxide layer. A fifth insulating layer 50 may be disposed on the fourth insulating layer 40 (e.g., disposed directly thereon in the third direction DR3). The fifth insulating layer 50 may be an organic layer.

A second connection electrode CNE2 may be disposed on the fifth insulating layer 50 (e.g., disposed directly thereon). The second connection electrode CNE2 may be connected to the first connection electrode CNE1 via a contact hole CNT-2 passing through the fourth insulating layer 40 and the fifth insulating layer 50.

A sixth insulating layer 60 may be disposed on the fifth insulating layer 50 (e.g., disposed directly thereon in the third direction DR3) and cover the second connection electrode CNE2. The sixth insulating layer 60 may be an organic layer.

A light-emitting element layer 130 may be disposed on the circuit layer 120 (e.g., in the third direction DR3). The light-emitting element layer 130 may include the light-emitting element 100PE. For example, in an embodiment the light-emitting element layer 130 may include an organic light-emitting material, an inorganic light-emitting material, an organic-inorganic light-emitting material, quantum dots, quantum rods, a micro-LED, or a nano-LED. Hereinafter, it will be illustrated, as an example, that the light-emitting element 100PE is an organic light-emitting element. However, embodiments of the present inventive concept are not necessarily limited thereto.

A light-emitting element 100PE may include a first electrode AE, a light-emitting layer EL, and a second electrode CE.

The first electrode AE may be disposed on the sixth insulating layer 60 (e.g., disposed directly thereon). In an embodiment, the first electrode AE may be connected to the second connection electrode CNE2 via a contact hole CNT-3 passing through the sixth insulating layer 60.

A pixel-defining film 70 may be disposed on the sixth insulating layer 60 (e.g., disposed directly thereon in the third direction DR3) and cover a portion of the first electrode AE. The pixel-defining film 70 has an opening 70-OP defined therein. The opening 70-OP of the pixel-defining film 70 may expose at least a portion of the first electrode AE, such as a central portion of the first electrode AE.

The active region 1000A (see FIG. 1) may include a light-emitting region PXA and a non-light-emitting region NPXA adjacent to the light-emitting region PXA. The non-light-emitting region NPXA may surround the light-emitting region PXA. In this embodiment, the light-emitting region PXA is defined to correspond to a portion of the first electrode AE exposed by the opening 70-OP.

The light-emitting layer EL may be disposed on the first electrode AE (e.g., in the third direction DR3). The light-emitting layer EL may be disposed on a region corresponding to the opening 70-OP. For example, the light-emitting layers EL may be separately formed in respective pixels. In an embodiment in which the light-emitting layer EL are separately formed in respective pixels, the light-emitting layers EL may emit light of at least one color of blue, red, or green. However, embodiments of the present inventive concept are not necessarily limited thereto. In an embodiment, the light-emitting layer EL may be connected to each of the pixels and included as a common layer. In this embodiment, the light-emitting layer EL may provide blue light or white light.

The second electrode CE may be disposed on the light-emitting layer EL (e.g., in the third direction DR3). The second electrode CE may have an integrated shape and be included in a plurality of pixels in common.

In an embodiment, a hole control layer may be disposed between the first electrode AE and the light-emitting layer EL. The hole control layer may be disposed in the light-emitting region PXA and the non-light-emitting region NPXA in common. The hole control layer may include a hole transport layer and further include a hole injection layer. An electron control layer may be disposed between the light-emitting layer EL and the second electrode CE. The electron control layer may include an electron transport layer and further include an electron injection layer. In an embodiment, the hole control layer and the electron control layer may be formed, in common, in a plurality of pixels by using an open mask or through an inkjet process.

An encapsulation layer 140 may be disposed on the light-emitting element layer 130 (e.g., disposed directly thereon in the third direction DR3). In an embodiment, the encapsulation layer 140 may include an inorganic layer, an organic layer, and an inorganic layer which are sequentially stacked (e.g., in the third direction DR3). However, the layers constituting the encapsulation layer 140 are not necessarily limited thereto. The inorganic layers may protect the light-emitting element layer 130 against moisture and oxygen, and the organic layer may protect the light-emitting element layer 130 against foreign substances such as dust particles. In an embodiment, the inorganic layers may include a silicon nitride layer, a silicon oxynitride layer, a silicon oxide layer, a titanium oxide layer, an aluminum oxide layer, or the like. The organic layer may include an acylate-based organic layer. However, embodiments of the present inventive concept are not necessarily limited thereto.

In an embodiment, the sensor layer 200 may include a base layer 201, a first conductive layer 202, a sensing-insulating layer 203, a second conductive layer 204, and a cover-insulating layer 205.

In an embodiment, the base layer 201 may be an inorganic layer including at least any one of silicon nitride, silicon oxynitride, or silicon oxide. Alternatively, the base layer 201 may be an organic layer including an epoxy resin, an acrylic resin, or an imide-based resin. The base layer 201 may have a single-layered structure or a multi-layered structure in which layers are stacked along the third direction DR3.

The first conductive layer 202 and the second conductive layer 204 each may have a single-layered structure or a multi-layered structure in which layers are stacked along the third direction DR3.

In an embodiment, a conductive layer having a single-layered structure may include a metal layer or transparent conductive layer. For example, in an embodiment the metal layer may include molybdenum, silver, titanium, copper, aluminum, or alloys thereof. A transparent conductive layer may include indium tin oxide (ITO), indium zinc oxide (IZO), zinc oxide (ZnO), indium zinc tin oxide (IZTO), or the like. In addition, a transparent conductive layer may include a conductive polymer, such as poly(3,4-ethylenedioxythiophene) (PEDOT), a metal nanowire, graphene, and the like.

A conductive layer having a multi-layered structure may include metal layers. In an embodiment, the metal layers may have a three-layer structure of titanium/aluminum/titanium. A conductive layer having a multi-layered structure may include at least one metal layer and at least one transparent conductive layer.

At least any one of the sensing-insulating layer 203 or the cover-insulating layer 205 may include an inorganic film. In an embodiment, the inorganic film may include at least one of aluminum oxide, titanium oxide, silicon oxide, silicon nitride, silicon oxynitride, zirconium oxide, or hafnium oxide.

At least any one of the sensing-insulating layer 203 or the cover-insulating layer 205 may include an organic film. In an embodiment, the organic film may include at least any one of an acylate-based resin, a methacrylate-based resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin.

An anti-reflection layer 300 may be disposed on the sensor layer 200 (e.g., disposed directly thereon in the third direction DR3). The anti-reflection layer 300 may include a division layer 310, a plurality of color filters 320, and a planarization layer 330.

The division layer 310 may be disposed to overlap a conductive pattern of a second conductive layer 204 (e.g., in the third direction DR3). The cover-insulating layer 205 may be disposed between the division layer 310 and the second conductive layer 204 (e.g., in the third direction DR3). However, embodiments of the present inventive concept are not necessarily limited thereto. For example, in an embodiment of the present inventive concept, the cover-insulating layer 205 may be omitted.

The division layer 310 may prevent reflection of external light due to the second conductive layer 204. A material constituting the division layer 310 is not necessarily limited as long as being a light-absorbing material. The division layer 310 may be a layer having a block color, and in an embodiment, the division layer 310 may include a black coloring agent. The black coloring agent may include a black dye and black pigment. The black coloring agent may include carbon black, metals such as chromium, or oxides thereof.

The division layer 310 may have a division opening 310-OP defined therein. The division opening 310-OP may overlap the light-emitting layer EL (e.g., in the third direction DR3). The color filters 320 may be disposed to correspond to the division opening 310-OP. The color filters 320 may transmit light provided from the light-emitting layer EL overlapping the color filters 320.

The planarization layer 330 may cover the division layer 310 and the color filters 320. The planarization layer 330 may include an organic material and provide a relatively flat upper surface. However, embodiments of the present inventive concept are not necessarily limited thereto. For example, in an embodiment, the planarization layer 330 may be omitted.

In an embodiment of the present inventive concept, the anti-reflection layer 300 may include a reflection control layer instead of the color filters 320. For example, in the illustration of FIG. 5, the color filters 320 may be omitted, and a reflection control layer may be added to a position in which the color filters 320 are omitted. The reflection control layer may selectively absorb light within a partial band among light reflected from the inside of a display panel and/or an electronic device or light incident from the outside of a display panel and/or an electronic device.

For example, in an embodiment the reflection control layer may absorb light having a first wavelength range of about 490 nm to about 505 nm and a second wavelength range of about 585 nm to about 600 nm. The reflection control layer may be provided to have a light transmittance of about 40% or less in the first wavelength range and the second wavelength range. The reflection control layer may absorb light having a wavelength that falls out of the wavelength ranges of red, green, and blue light emitted from the light-emitting layer EL. Accordingly, the reflection control layer absorbs light having the wavelength which does not fall within the wavelength ranges of red, green, or blue light emitted from the light-emitting layer EL, and thus a decrease in luminance of a display panel and/or an electronic device may be prevented or reduced. In addition, a decrease in luminous efficiency of a display panel and/or an electronic device may be prevented or minimized, and also visibility may be increased.

In an embodiment, the reflection control layer may be provided as an organic material layer including a dye, a pigment, or combinations thereof. For example, in an embodiment the reflection control layer may include a tetraazaporphyrin (TAP)-based compound, a porphyrin-based compound, a metal porphyrin-based compound, an oxazine-based compound, a squarylium-based compound, a triarylmethane-based compound, a polymethine-based compound, an anthraquinone-based compound, a phthalocyanine-based compound, an azo-based compound, a perylene-based compound, a xanthene-based compound, a diimmonium-based compound, a dipyrromethene-based compound, a cyanine-based compound, and combinations thereof.

In an embodiment, the reflection control layer may have a transmittance in a range of about 64% to about 72%. The transmittance of the reflection control layer may be adjusted according to a content of a pigment and/or a dye included in the reflection control layer.

Figure 6:
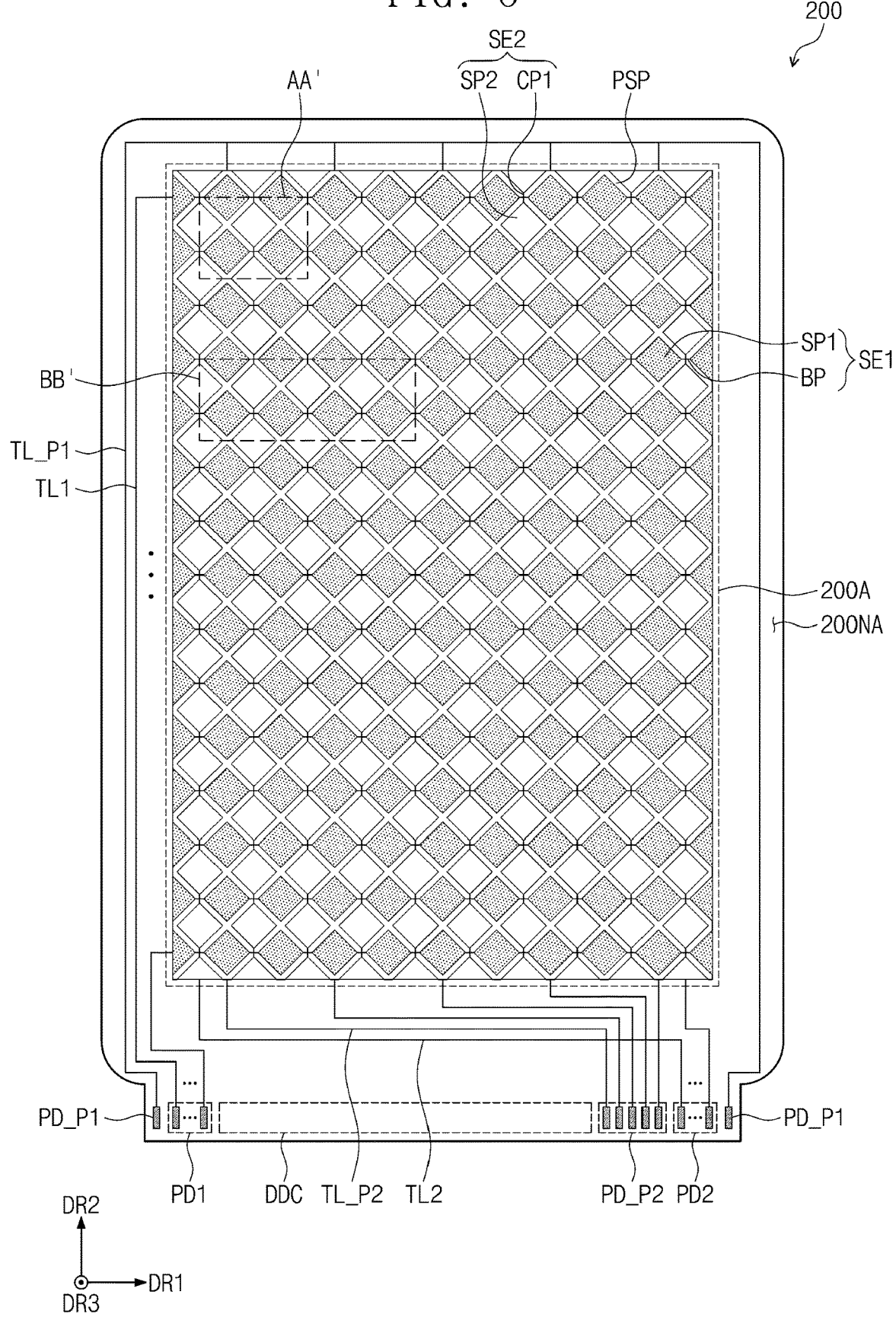
FIG. 6 is a plan view of a sensor layer according to an embodiment of the present inventive concept.
Figure 7:
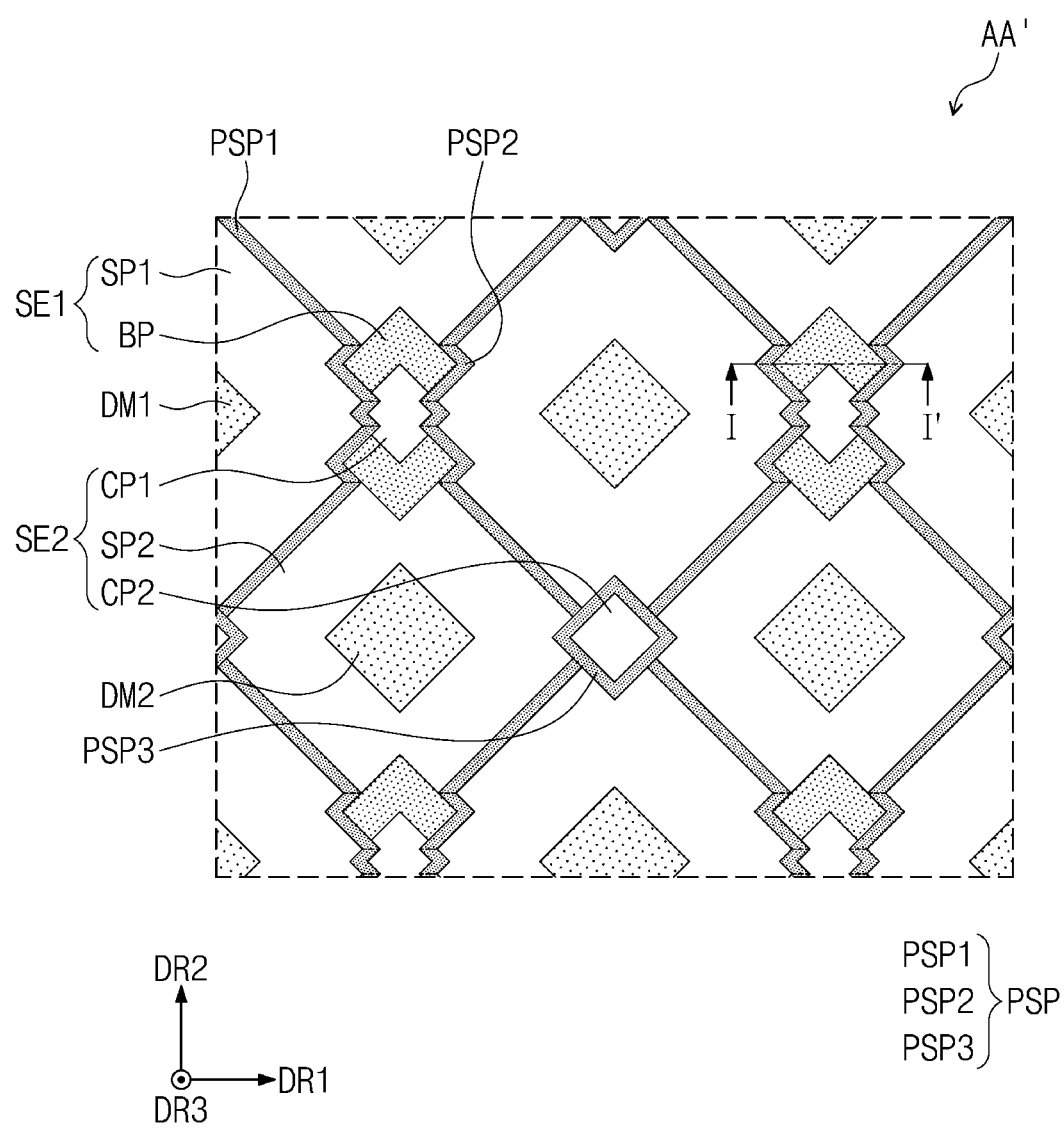
FIG. 7 is an enlarged view of a region corresponding to AA' of FIG. 6 according to an embodiment of the present inventive concept.

FIG. 6 is a plan view of a sensor layer 200 according to an embodiment of the present inventive concept. FIG. 7 is an enlarged view of a region corresponding to AA' of FIG. 6.

Referring to FIGS. 6 and 7, a sensing region 200A and a peripheral region 200NA adjacent to the sensing region 200A may be defined in the sensor layer 200. The sensing region 200A may correspond to the active region 1000A (see FIG. 1), and the peripheral region 1000NA (see FIG. 1) may correspond to the peripheral region 200NA. FIG. 6 illustrates the sensing region 200A having a quadrilateral frame shape (e.g., in a plane defined in the first and second directions DR1, DR2) and the peripheral region 200NA having a quadrilateral frame shape (e.g., in a plane defined in the first and second directions DR1, DR2) and surrounding the sensing region 200A. However, the shapes and arrangements of the sensing region 200A and the peripheral region 200NA are not necessarily limited thereto.

In an embodiment, the sensor layer 200 may include first electrodes SE1, second electrodes SE2, and pen-sensing electrode PSP, which are arranged in the sensing region 200A, and a plurality of signal lines TL1 and TL2, a plurality of pen signal lines TL_P1 and TL_P2, a plurality of pads PD1 and PD2, and a plurality of pen pads PD_P1 and PD_P2, which are arranged in a pen-sensing electrode PSP and the peripheral region 200NA. The first electrodes SE1 may be referred to as a plurality of first sensing electrodes, and the second electrodes SE2 may be referred to as a plurality of second sensing electrodes.

In an embodiment, the first electrodes SE1 may each extend along the first direction DR1, and the first electrodes SE1 may be arranged to be spaced apart from each other in the second direction DR2. The second electrodes SE2 may each extend along the second direction DR2, and the second electrodes SE2 may be arranged to be spaced apart from each other in the first direction DR1. The first electrodes SE1 and the second electrodes SE2 may extend to cross each other while being insulated from each other. FIG. 6 illustrates fifteen first electrodes SE1 and ten second electrodes SE2 as an example. However, the number of the first electrodes SE1 and the number of the second electrodes SE2 are not necessarily limited thereto and may vary.

The first electrodes SE1 may respectively include a plurality of sensing patterns SP1 arranged along the first direction DR1, and a plurality of bridge patterns BP, electrically connected to the plurality of sensing patterns SP1. Two sensing patterns SP1 adjacent to each other (e.g., in the first direction DR1) among the plurality of sensing patterns SP1 may be electrically connected to each other via two bridge patterns BP adjacent to each other among the plurality of bridge patterns BP. For example, in an embodiment two bridge patterns BP may be disposed between two sensing patterns SP1 adjacent to each other in the first direction DR1 and electrically connect two sensing patterns SP1. The plurality of bridge patterns BP may be disposed on a layer different from a layer on which the plurality of sensing patterns SP1 and the second electrodes SE2 are disposed.

The second electrodes SE2 may respectively include a plurality of sensing portions SP2 arranged along the second direction DR2 and first connection portions CP1 extending from the plurality of sensing portions SP2 in the second direction DR2. In an embodiment, the plurality of sensing portions SP2 and the first connection portions CP1 may be integrally formed. The plurality of sensing portions SP2 and the first connection portions CP1 may be disposed on the same layer. The first connection portions CP1 may be electrically connected to the plurality of sensing portions SP2. The first connection portions CP1 may be disposed between two sensing portions SP2 adjacent to each other in the second direction DR2 to electrically connect the two sensing portions SP2. The first connection portions CP1 may be defined as a portion, of the second electrodes SE2, crossing the first electrodes SE1. The first connection portions CP1 and the plurality of bridge patterns BP may be respectively disposed on different layers and cross each other (e.g., in the third direction DR3) while being insulated from each other.

In an embodiment, the second electrodes SE2 may further respectively include second connection portions CP2 extending from the plurality of sensing portions SP2 in the first direction DR1. In an embodiment, the plurality of sensing portions SP2 and the second connection portions CP2 may be integrally formed. The plurality of sensing portions SP2 and the second connection portions CP2 may be disposed on the same layer as each other. For example, the plurality of sensing portions SP2, the first connection portions CP1, and the second connection portions CP2 may be integrally formed, and the second electrodes SE2 may be disposed on the same layer. In addition, the second electrodes SE2 may be disposed on the same layer as the plurality of sensing patterns SP1. The second connection portions CP2 may be electrically connected to the plurality of sensing portions SP2. The second connection portions CP2 may be disposed between two sensing portions SP2 adjacent to each other in the first direction DR1 to electrically connect the two sensing portions SP2 to each other. The second connection portions CP2 may be defined as a portion not crossing the plurality of bridge patterns BP. For example, the second connection portions CP2 may not overlap the bridge patterns BP (e.g., in the third direction DR3).

FIGS. 6 and 7 illustrate that the second electrodes SE2 include the second connection portions CP2. However, embodiments of the present inventive concept are not necessarily limited thereto. For example, in an embodiment the second electrodes SE2 may include only the first connection portions CPL.

The pen-sensing electrode PSP may include first pen-sensing patterns PSP1 and second pen-sensing patterns PSP2. The first pen-sensing patterns PSP1 may overlap boundaries of the plurality of sensing patterns SP1 and the plurality of sensing portions SP2 when viewed from the top, such as in a plan view (e.g., overlap in the third direction DR3). The second pen-sensing patterns PSP2 may be adjacent to boundaries of the plurality of bridge patterns BP. The first pen-sensing patterns PSP1 and the second pen-sensing patterns PSP2 may be integrally formed.

In an embodiment in which the second electrodes SE2 include the second connection portions CP2, the pen-sensing electrode PSP may further include third pen-sensing patterns PSP3. The third pen-sensing patterns PSP3 may overlap boundaries of the second connection portions CP2 when viewed from the top (e.g., overlap in the third direction DR3). The third pen-sensing patterns PSP3 may be integrally formed with first and second pen-sensing patterns PSP2. In an embodiment, the pen-sensing electrode PSP may be disposed on the same layer as the plurality of bridge patterns BP of the first electrodes SE1.

The sensor layer 200 may further include a plurality of dummy patterns, such as first and second dummy patterns DM1 and DM2. The plurality of dummy patterns may be disposed on the same layer as the plurality of sensing patterns SP1 and the second electrodes SE2. For example, in an embodiment the plurality of dummy patterns, such as the first and second dummy patterns DM1 and DM2, may be disposed on a layer different from a layer on which the pen-sensing electrode PSP is disposed. In an embodiment, the plurality of dummy patterns DM1 and DM2 may include a first dummy pattern DM1 and a second dummy pattern DM2. However, embodiments of the present inventive concept are not necessarily limited thereto and the number of the plurality of dummy patterns may vary. In an embodiment, the first dummy pattern DM1 may be formed in one sensing pattern SP1, such as a central portion of the one sensing pattern SP1, and the second dummy pattern DM2 may be formed in one sensing portion SP2, such as a central portion of one sensing portion SP2. However, embodiments of the present inventive concept are not necessarily limited thereto. For example, in an embodiment a dummy pattern disposed on a different layer while overlapping with the pen-sensing electrode PSP when viewed from the top (e.g., in a plan view) may be additionally included.

In an embodiment, the plurality of signal lines may include a plurality of first signal lines TL1 connected to the first electrodes SE1 and a plurality of second signal lines TL2 connected to the second electrodes SE2. The plurality of pads PD1 and PD2 may include first pads PD1 and second pads PD2. In an embodiment, a driving signal may be applied to the plurality of second electrodes SE2 via the plurality of second signal lines TL2, and a change in capacitance formed between the first and second electrodes SE1 and SE2 may be output as a sensing signal via the plurality of first signal lines TL1. The detailed description thereof will be described later with reference to FIG. 12.

First ends of the plurality of first signal lines TL1 may be connected to first ends of the first electrodes SE1. In an embodiment, the plurality of first signal lines TL1 may extend to a lower side of the peripheral region 200NA (e.g., in the second direction DR2), and the second ends of the plurality of first signal lines TL1 may be connected to the first pads PD1.

First ends of the plurality of second signal lines TL2 may be connected to first ends of the second electrodes SE2. The plurality of second signal lines TL2 may extend to the peripheral region 200NA, and the second ends of the plurality of second signal lines TL2 may be respectively connected to the second pads PD2.

In an embodiment, the plurality of first signal lines TL1 connected to the first electrodes SE1 may each be a reception wire, and the plurality of second signal lines TL2 connected to the second electrodes SE2 may each be a transmission wire. However, embodiments of the present inventive concept are not necessarily limited thereto, and in some embodiments the plurality of first signal lines TL1 may each be a transmission wire, and the plurality of second signal lines TL2 may each be a reception wire.

In an embodiment, the first and second pads PD1 and PD2 and the plurality of pen pads PD_P1 and PD_P2 may be arranged in the peripheral region 200NA adjacent to a lower side of the sensing region 200A on a plane (e.g., in the second direction DR2). FIG. 6 illustrates that the first and second pads PD1 and PD2 and the plurality of pen pads PD_P1 and PD_P2 are arranged in a row with a data driver DDC. However, embodiments of the present inventive concept are not necessarily limited thereto.

In an embodiment, the plurality of pen signal lines TL_P1 and TL_P2 may include a first pen signal line TL_P1 and a second pen signal line TL_P2. The plurality of pen pads PD_P1 and PD_P2 may include a first pen pad PD_P1 and a second pen pad PD_P2.

The first pen signal line TL_P1 may extend to the peripheral region 200NA, and a first end and a second end of the first pen signal line TL_P1 may be connected to the first pen pad PD_P1. The first pen signal line TL_P1 may be electrically connected to all of the pen-sensing electrodes PSP. Any one of the first pen signal line TL_P1 or the pen-sensing electrode PSP may form a coil. Therefore, a pen disposed in a region adjacent to the peripheral region 200NA may also be fully charged through a portion of the first pen signal line TL_P1 formed on left and right sides of the sensor layer 200.

In an embodiment, the second pen signal line TL_P2 may be connected in a one-to-one correspondence with the pen-sensing electrode PSP. In addition, the second pen signal line TL_P2 may extend to the peripheral region 200NA to be connected to the second pen pad PD_P2. For example, the second pen signal line TL_P2 may be connected in a one-to-one correspondence with the second pen pad PD_P2. For example, a first end of the second pen signal line TL_P2 may be connected to the pen-sensing electrode PSP, and a second end of the second pen signal line TL_P2 may be connected to the second pen pad PD_P2.

Figure 8:
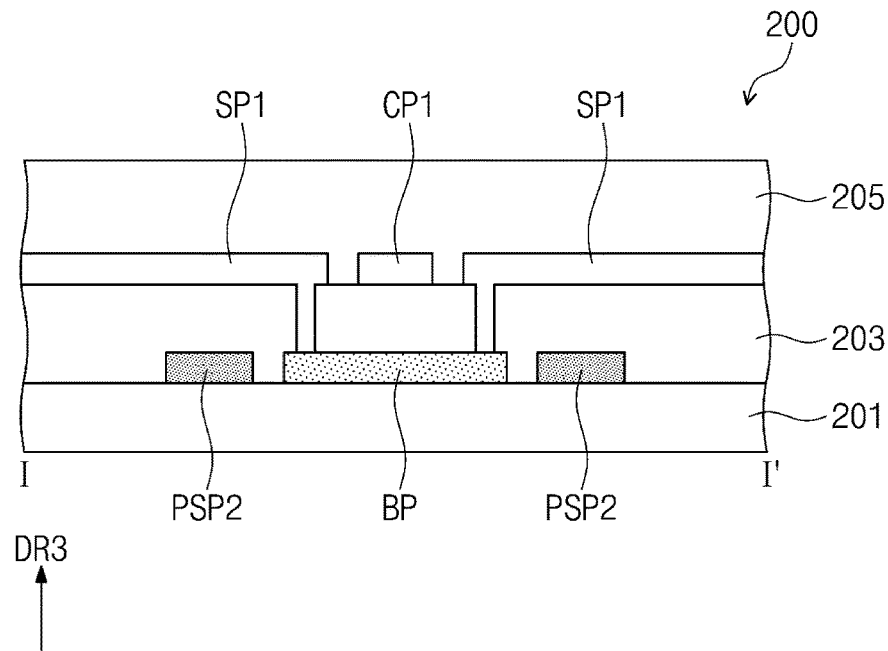
FIG. 8 is a cross-sectional view of a sensor layer taken along line I-I' of FIG. 7 according to an embodiment of the present inventive concept.

FIG. 8 is a cross-sectional view of a sensor layer 200 taken along cutting line I-I' of FIG. 7.

Referring to FIGS. 5, 7, and 8, in an embodiment the plurality of bridge patterns BP may be electrically connected to the plurality of sensing patterns SP1 via the contact hole passing through the sensing-insulating layer 203. The plurality of bridge patterns BP may be disposed on the same layer as the pen-sensing electrode PSP, and the plurality of bridge patterns BP may be disposed on a layer different from a layer on which the plurality of sensing patterns SP1 and the second electrodes SE2 are disposed. FIG. 8 illustrates the plurality of sensing patterns SP1, the second pen-sensing patterns PSP2 among the pen-sensing electrode PSP, and the first connection portions CP1 of the second electrodes SE2.

In an embodiment, the plurality of bridge patterns BP and the pen-sensing electrode PSP may be disposed on (e.g., disposed directly thereon in the third direction DR3) the first layer 201 (or base layer), and the plurality of sensing patterns SP1 and the second electrodes SE2 may be disposed on (e.g., disposed directly thereon in the third direction DR3) the second layer 203 (or sensing-insulating layer). For example, the first conductive layer 202 of the sensor layer 200 may include the plurality of bridge patterns BP and the pen-sensing electrode PSP, and the second conductive layer 204 of the sensor layer 200 may include the plurality of sensing patterns SP1 and the second electrodes SE2. The second layer 203 may be disposed on the first layer 201 (e.g., in the third direction DR3). The distance from the display layer 100 to the second layer 203 may be greater than the distance from the display layer 100 to the first layer 201. For example, the distance from the base substrate 110 to the second layer 203 in the third direction DR3 may be greater than the distance from the base substrate 110 to the first layer 201.

Figure 9:
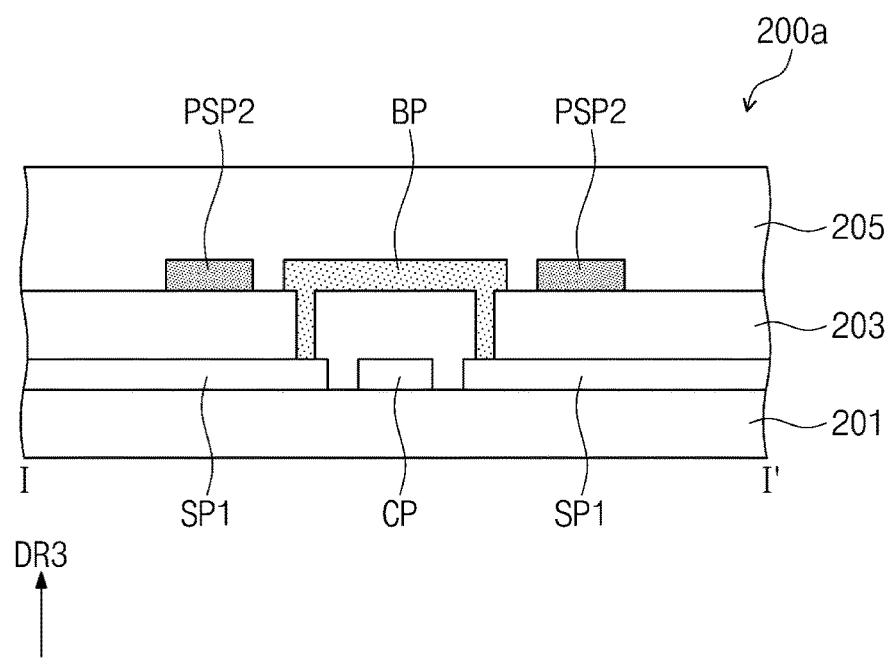
FIG. 9 is a cross-sectional view of a sensor layer taken along line I-I' of FIG. 7 according to an embodiment of the present inventive concept.

FIG. 9 is a cross-sectional view of a sensor layer 200a taken along cutting line I-I' of FIG. 7.

Referring to FIGS. 5, 7, and 9, in an embodiment the plurality of bridge patterns BP may be electrically connected to the plurality of sensing patterns SP1 via the contact hole passing through the sensing-insulating layer 203. The plurality of bridge patterns BP may be disposed on the same layer as the pen-sensing electrode PSP, and the plurality of bridge patterns BP may be disposed on a layer different from a layer on which the plurality of sensing patterns SP1 and the second electrodes SE2 are disposed. FIG. 9 illustrates the plurality of sensing patterns SP1, the second pen-sensing patterns PSP2 among the pen-sensing electrode PSP, and the first connection portions CP1 of the second electrodes SE2.

In an embodiment, the plurality of sensing patterns SP1 and the second electrodes SE2 may be disposed on (e.g., disposed directly thereon in the third direction DR3) the first layer 201, and the plurality of bridge patterns BP and the pen-sensing electrode PSP may be disposed on (e.g., disposed directly thereon in the third direction DR3) the second layer 203. For example, the first conductive layer 202 of the sensor layer 200 may include the plurality of sensing patterns SP1 and the second electrodes SE2, and the second conductive layer 204 of the sensor layer 200 may include the plurality of bridge patterns BP and the pen-sensing electrode PSP. The second layer 203 may be disposed on the first layer 201 (e.g., in the third direction DR3). The distance from the display layer 100 to the second layer 203 may be greater than the distance from the display layer 100 to the first layer 201. For example, the distance from the base substrate 110 to the second layer 203 in the third direction DR3 may be greater than the distance from the base substrate 110 to the first layer 201.

Figure 10:
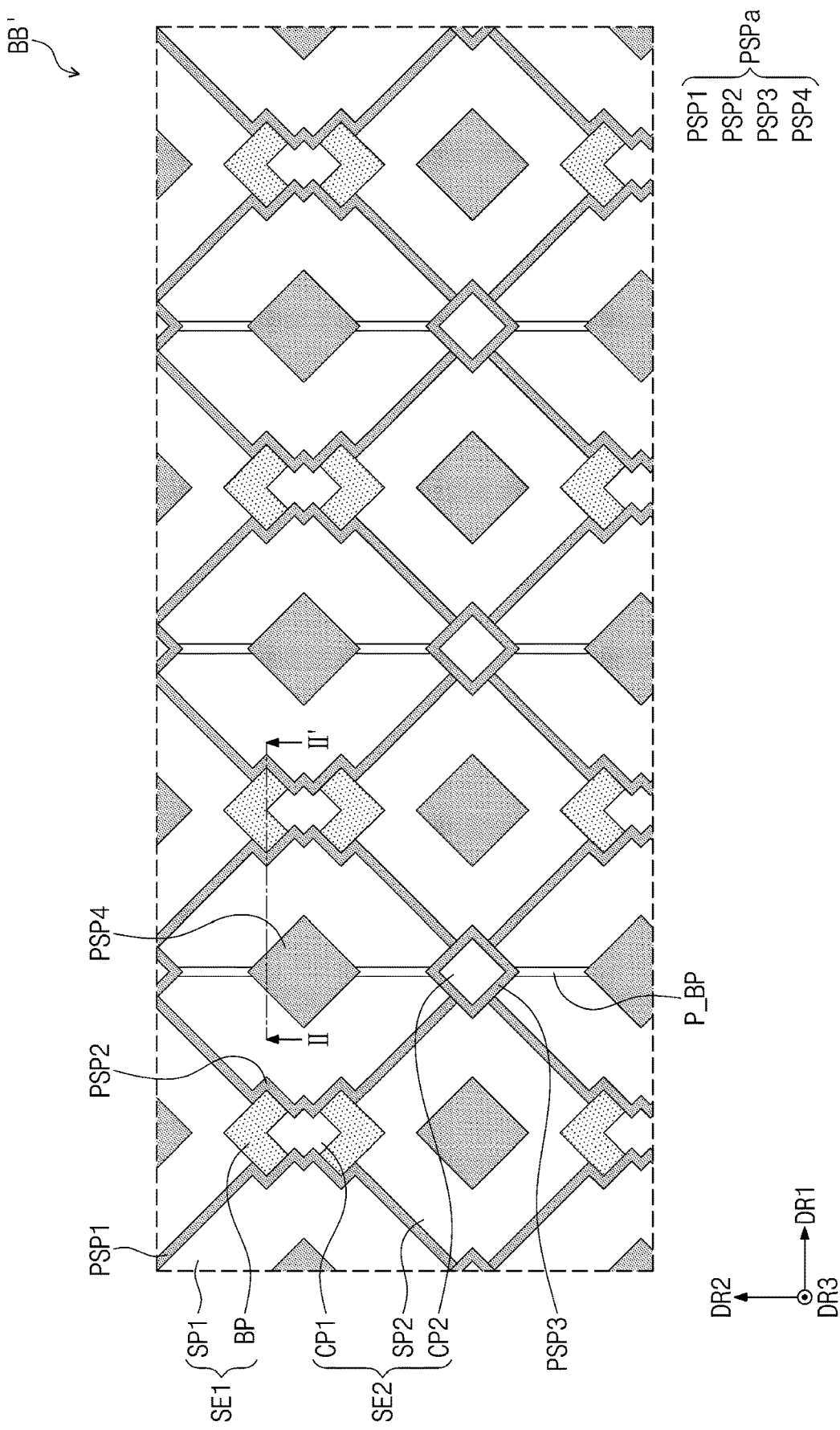
FIG. 10 is an enlarged view of a region corresponding to BB' of FIG. 6 according to an embodiment of the present inventive concept.
Figure 11:
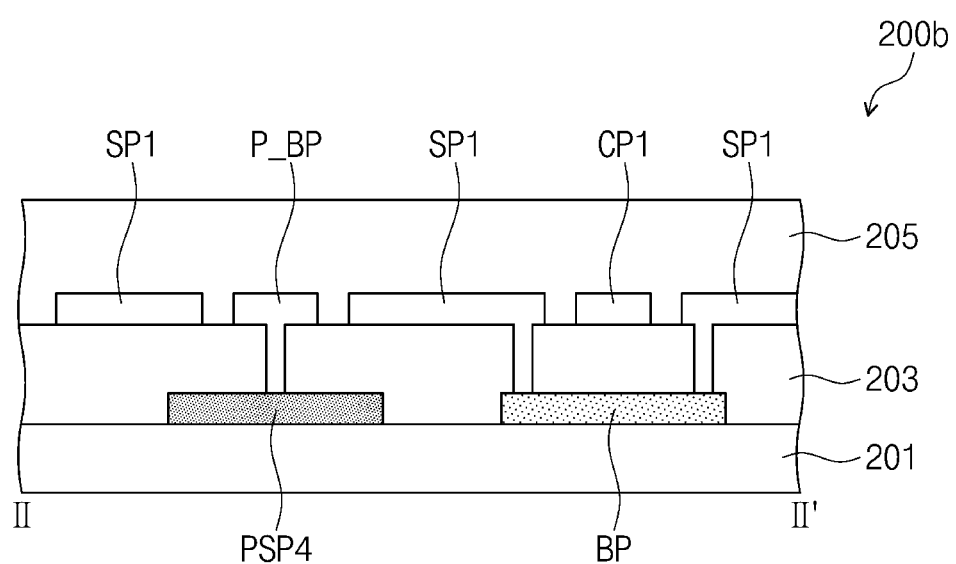
FIG. 11 is a cross-sectional view of a sensor layer taken along line II-II' of FIG. 10 according to an embodiment of the present inventive concept.

FIG. 10 is an enlarged view of a region corresponding to BB' of FIG. 6. FIG. 11 is a cross-sectional view of a sensor layer 200b taken along cutting line II-II' of FIG. 10. FIGS. 10 and 11 will be described with reference to FIGS. 1 to 8, and the description of the same reference numerals or symbols previously described may be omitted for economy of description.

Referring to FIG. 10, a pen sensing electrode PSPa may further include fourth pen sensing patterns PSP4 overlapping the plurality of sensing patterns SP1 when viewed from the top (e.g., overlapping in the third direction DR3). The fourth pen sensing patterns PSP4 may be arranged to be spaced apart from the first to third pen sensing patterns PSP1, PSP2, and PSP3 when viewed from the top (e.g., spaced apart in the first and/or second directions DR1, DR2). When viewed from the top, the fourth pen sensing patterns PSP4 may have smaller sizes (e.g., area in the plane defined in the first and second directions DR1, DR2) than the plurality of sensing patterns SP1. The pen sensing electrode PSPa may be disposed on the same layer as the plurality of bridge patterns BP. For example, the fourth pen sensing patterns PSP4 may be disposed on the same layer as the plurality of bridge patterns BP. The pen sensing electrode PSPa further includes the fourth pen sensing patterns PSP4, and thus a pen-sensing region may be increased. Therefore, sensing sensitivity for pen sensing may be increased.

The sensor layer 200b may further include pen bridge patterns P_BP which electrically connect the fourth pen sensing patterns PSP4. In an embodiment the pen bridge patterns P_BP may extend in the second direction DR2 and be arranged to be spaced apart from each other in the first direction DR1. The pen bridge patterns P_BP may be disposed on the same layer as the plurality of sensing patterns SP1 and second electrodes SE2. For example, the pen bridge patterns P_BP may be disposed on a layer different from a layer on which the fourth pen sensing patterns PSP4 are disposed, and be electrically connected to the fourth pen sensing patterns PSP4.

Referring to FIGS. 5, 10, and 11, in an embodiment the plurality of bridge patterns BP may be electrically connected to the plurality of sensing patterns SP1 via the contact hole passing through the sensing-insulating layer 203. The plurality of bridge patterns BP may be disposed on the same layer as the pen sensing electrode PSPa, and the plurality of bridge patterns BP may be disposed on a layer different from a layer on which the plurality of sensing patterns SP1 and the second electrodes SE2 are disposed. FIG. 11 illustrates the plurality of sensing patterns SP1, the fourth pen sensing patterns PSP4 among the pen sensing electrode PSPa, and the first connection portions CP1 of the second electrodes SE2.

The plurality of pen bridge patterns P_BP may be electrically connected to the fourth pen sensing patterns PSP4 via the contact hole passing through the sensing-insulating layer 203. The plurality of pen bridge patterns P_BP may be disposed on the same layer as the plurality of sensing patterns SP1 and the second electrodes SE2, and be disposed on a layer different from a layer on which the pen sensing electrode PSPa is disposed. For example, the first conductive layer 202 of the sensor layer 200 may include the pen sensing electrode PSPa and the plurality of pen bridge patterns P_BP, and the second conductive layer 204 of the sensor layer 200 may include the plurality of sensing patterns SP1, the second electrodes SE2, and the plurality of pen bridge patterns P_BP.

Figure 12:
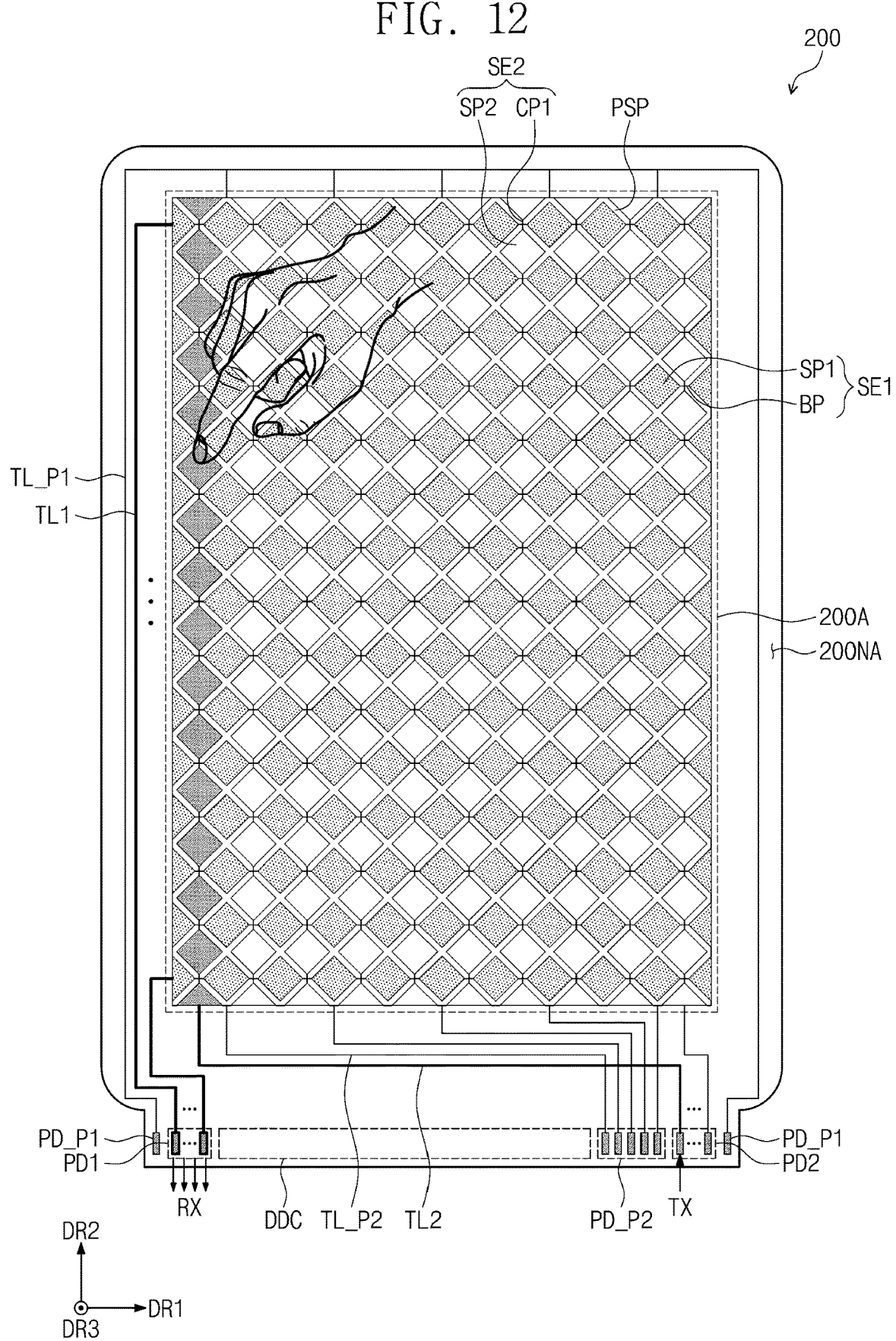
FIG. 12 is a plan view for illustrating a first mode according to an embodiment of the present inventive concept.

FIG. 12 is a view for illustrating a first mode according to an embodiment of the present inventive concept.

Referring to FIG. 4 and FIG. 12, in the first mode, the sensor driver 200C may sequentially provide a transmission signal TX to the second electrodes SE2 and detect coordinates of the first input 2000 by using a reception signal RX detected through the first electrodes SE1. In an embodiment, in the first mode, the pen-sensing electrode PSP may be grounded via a ground wire, applied with a constant voltage, or electrically floated.

FIG. 12 illustrates that the transmission signal TX is provided to one second electrode SE2, and the reception signal RX is output from the first electrodes SE1. For ease of understanding, FIG. 12 illustrates that only one second electrode SE2 to which the transmission signal TX is provided is indicated by hatching. The sensor driver 200C may sense a change in capacitance between the first electrode SE1 and the second electrodes SE2, thereby detecting input coordinates of the first input 2000.

Figure 13:
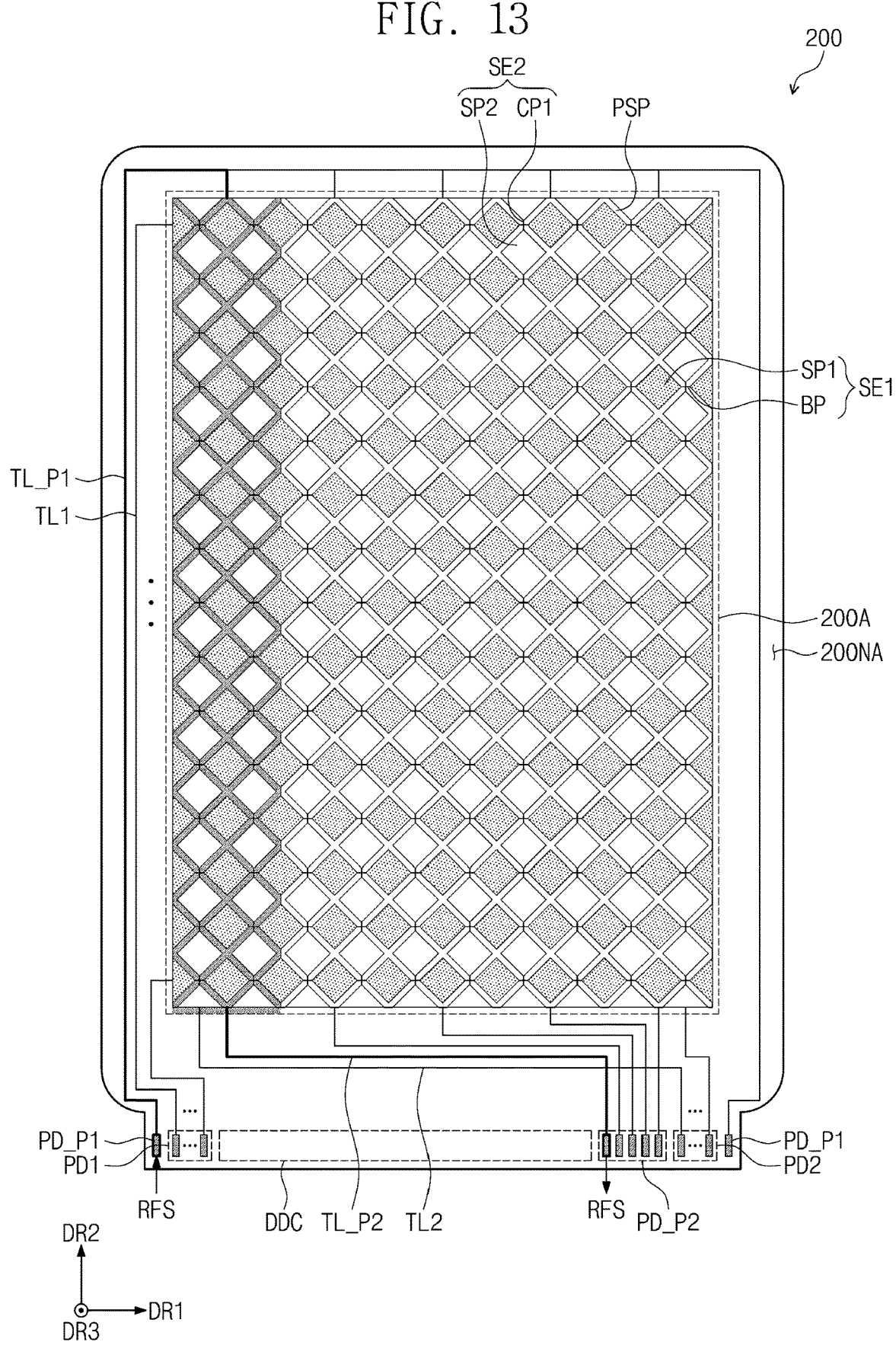
FIG. 13 is a plan view for illustrating a second mode according to an embodiment of the present inventive concept.

FIG. 13 is a view for illustrating a second mode according to an embodiment of the present inventive concept.

Referring to FIGS. 4 and 13, the second mode may be a charging section. In an embodiment, the sensor driver 200C may apply an electric current RFS to one pad of a first pen pad PD_P1 and a second pen pad PD_P2, and receive the electric current RFS through the other pad. For example, a ground voltage may be applied to the other pad. In an embodiment, the one pad and the other pad of the first pen pad PD_P1 and the second pen pad PD_P2 may be continuously modified. Therefore, loop coil patterns in various positions and various shapes may form a magnetic field.

FIG. 13 illustrates an embodiment in which an electric current RFS is provided to a first pen pad PD_P1 and is received through one second pen pad PD_P2. In this embodiment, a current path in a coil form may be defined by a portion of a first pen signal line TL_P1 connected to the first pen pad PD_P1, a portion of a second pen signal line TL_P2 connected to the second pen pad PD_P2, and the pen-sensing electrode PSP connected to the second pen signal line TL_P2. In the second mode, a resonant circuit of the pen PN may be charged through the current path.

According to an embodiment of the present inventive concept, a current path having a loop coil pattern may be formed by the components included in the sensor layer 200. Thus, the electronic device 1000 (see FIG. 1) may detect an input by the pen PN even when not including a digitizer. Therefore, since it is unnecessary to add a digitizer for sensing the pen PN, an increase in a thickness and weight, and a decrease in flexibility of the electronic device 1000 caused by addition of the digitizer may not occur, and a production cost of an electronic device may be reduced.

Figure 14:
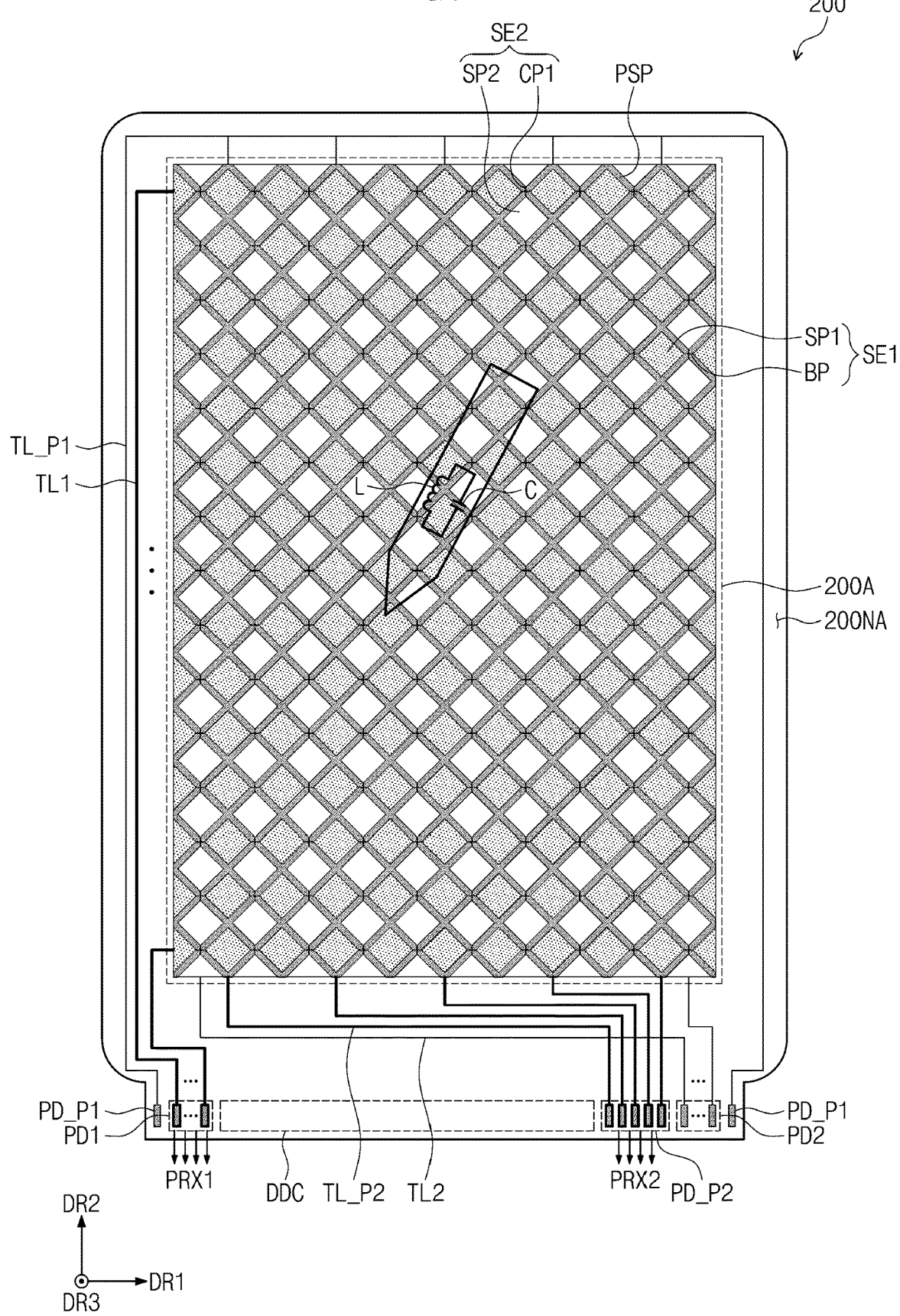
FIG. 14 is a plan view for illustrating a third mode according to an embodiment of the present inventive concept.

FIG. 14 is a view for illustrating a third mode according to an embodiment of the present inventive concept.

Referring to FIGS. 4 and 14, the third mode may be a mode of sensing the pen PN. In the third mode, the sensor driver 200C may receive a first reception signal PRX1 from the first electrodes SE1, and receive a second reception signal PRX2 from the second electrodes SE2. In an embodiment, a pen-sensing electrode PSP may be grounded via a ground wire, or may be applied with a constant voltage.

The LC resonant circuit of the pen PN may produce a magnetic field having a resonant frequency while discharging a charge. An induced current may be generated in the pen-sensing electrode PSP due to the magnetic field provided from the pen PN. The sensor driver 200C may receive the first reception signal PRX1 based on an induced current from the first electrode SE1 and receive the second reception signal PRX2 based on an induced current from the second electrode SE2. The sensor driver 200C may detect input coordinates of the pen PN on the basis of the first reception signal PRX1 and the second reception signal PRX2.

According to the description above, a sensor layer may include a pen-sensing electrode disposed on a layer different from a layer on which a plurality of sensing patterns and a plurality of second sensing electrodes are disposed. A current path in a coil form may be formed by components included in a sensor layer of an electronic device. The electronic device may detect an input by a pen even when not including a digitizer. For example, the sensor layer according to an embodiment of the present inventive concept may detect an input by touch and also detect an input by a pen. Therefore, since it is unnecessary to add a digitizer for pen sensing, an increase in a thickness and weight, and a decrease in flexibility of the electronic device caused by addition of the digitizer may not occur, and thus a production cost of the electronic device may be reduced.

Although embodiments of the present inventive concept have been described, it is understood that the present inventive concept should not be limited to these embodiments but various changes and modifications can be made by one ordinary skilled in the art within the spirit and scope of the present inventive concept.

What is claimed is:

1. An electronic device comprising:
   a display layer displaying an image; and
   a sensor layer disposed on the display layer,
   wherein the sensor layer includes
      a plurality of first sensing electrodes including a plurality of sensing patterns arranged along a first direction, and a plurality of bridge patterns electrically connecting adjacent sensing patterns of the plurality of sensing patterns,
      a plurality of second sensing electrodes including a plurality of sensing portions arranged along a second direction crossing the first direction, and first connection portions extending in the second direction from the plurality of sensing portions, and
      a pen-sensing electrode disposed on a same layer as the plurality of bridge patterns,
      the pen-sensing electrode is disposed on a different layer than the plurality of sensing patterns and the plurality of second sensing electrodes.

2. The electronic device of claim 1, wherein:
   the pen-sensing electrode comprises first pen-sensing patterns and second pen-sensing patterns; and
   the first pen-sensing patterns overlap boundaries of the plurality of sensing patterns and the plurality of sensing portions in a plan view, and the second pen-sensing patterns are adjacent to boundaries of the plurality of bridge patterns.

3. The electronic device of claim 2, wherein the plurality of second sensing electrodes further comprise second connection portions extending from the plurality of sensing portions in the first direction.

4. The electronic device of claim 3, wherein:
   the pen-sensing electrode further comprises third pen-sensing patterns, and
   the third pen-sensing patterns overlap boundaries of the second connection portions in the plan view.

5. The electronic device of claim 4, wherein the pen-sensing electrode further comprises fourth pen-sensing patterns overlapping the plurality of sensing patterns in the plan view.

6. The electronic device of claim 5, wherein:
   the sensor layer further comprises pen bridge patterns electrically connecting the fourth pen-sensing patterns; and
   the pen bridge patterns are disposed on a same layer as the plurality of sensing patterns and the plurality of second sensing electrodes.

7. The electronic device of claim 6, wherein the pen bridge patterns extend in the second direction and are arranged to be spaced apart from each other in the first direction.

8. The electronic device of claim 6, wherein in the plan view, each of the fourth pen-sensing patterns have a smaller size than each of the plurality of sensing patterns.

9. The electronic device of claim 6, wherein the fourth pen-sensing patterns are arranged to be spaced apart from the first to third pen-sensing patterns in the plan view.

10. The electronic device of claim 1, wherein:
    the plurality of bridge patterns and the pen-sensing electrode are disposed directly on a first layer, and
    the plurality of sensing patterns and the plurality of second sensing electrodes are disposed directly on a second layer,
    wherein a distance from the display layer to the second layer is greater than a distance from the display layer to the first layer.

11. The electronic device of claim 1, wherein:
    the plurality of sensing patterns and the plurality of second sensing electrodes are disposed directly on a first layer, and the plurality of bridge patterns and the pen-sensing electrode are disposed directly on a second layer,
    wherein a distance from the display layer to the second layer is greater than a distance from the display layer to the first layer.

12. An input-sensing unit comprising:
    a plurality of first sensing electrodes including a plurality of sensing patterns arranged along a first direction, and a plurality of bridge patterns disposed on a different layer than the plurality of sensing patterns;
    a plurality of second sensing electrodes including a plurality of sensing portions arranged along a second direction crossing the first direction, and first connection portions extending from the plurality of sensing portions in the second direction;
    first pen-sensing patterns disposed on a same layer as the plurality of bridge patterns and overlapping boundaries of the plurality of sensing patterns and the plurality of sensing portions in a plan view; and
    second pen-sensing patterns disposed on the same layer as the plurality of bridge patterns, the second pen-sensing patterns are adjacent to boundaries of the plurality of bridge patterns.

13. The input-sensing unit of claim 12, wherein the plurality of second sensing electrodes further comprise second connection portions extending from the plurality of sensing portions in the first direction.

14. The input-sensing unit of claim 13, further comprising third pen-sensing patterns disposed on the same layer as the plurality of bridge patterns and overlapping boundaries of the second connection portions in the plan view.

15. The input-sensing unit of claim 14, further comprising:
fourth pen-sensing patterns disposed on the same layer as the plurality of bridge patterns and overlapping the plurality of sensing patterns in the plan view; and
pen bridge patterns disposed on a same layer as the plurality of sensing patterns and the plurality of second sensing electrodes, the pen bridge patterns electrically connecting the fourth pen-sensing patterns.

16. The input-sensing unit of claim 15, wherein the pen bridge patterns extend in the second direction and are arranged to be spaced apart from each other in the first direction.

17. The input-sensing unit of claim 15, wherein in the plan view each of the fourth pen-sensing patterns have a smaller size than each of the plurality of sensing patterns.

18. The input-sensing unit of claim 15, wherein the fourth pen-sensing patterns are arranged to be spaced apart from the first to third pen-sensing patterns in the plan view.

19. The input-sensing unit of claim 12, wherein:
the plurality of sensing patterns and the plurality of second sensing electrodes are disposed directly on a first layer, and the plurality of bridge patterns, the first pen-sensing patterns, and the second pen-sensing patterns are disposed directly on a second layer; and
the second layer is disposed above the first layer.

20. The input-sensing unit of claim 12, wherein:
the plurality of bridge patterns, the first pen-sensing patterns, and the second pen-sensing patterns are disposed directly on a first layer, and the plurality of sensing patterns and the plurality of second sensing electrodes are disposed directly on a second layer; and
the second layer is disposed above the first layer.

* * * * *